(12) United States Patent
Reinhardt et al.

(10) Patent No.: US 11,206,507 B2
(45) Date of Patent: Dec. 21, 2021

(54) LOCALIZATION DETERMINATION FOR MIXED REALITY SYSTEMS

(71) Applicant: Magic Leap, Inc., Plantation, FL (US)

(72) Inventors: Benjamin Zaaron Reinhardt, San Francisco, CA (US); Samuel Phoa Kho, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/945,613

(22) Filed: Jul. 31, 2020

(65) Prior Publication Data

US 2020/0367018 A1 Nov. 19, 2020

Related U.S. Application Data

(63) Continuation of application No. 15/877,359, filed on Jan. 22, 2018, now Pat. No. 10,812,936.

(Continued)

(51) Int. Cl.
*H04W 4/02* (2018.01)
*G06F 16/29* (2019.01)
(Continued)

(52) U.S. Cl.
CPC .......... *H04W 4/026* (2013.01); *G06F 3/011* (2013.01); *G06F 16/29* (2019.01); *G06F 16/907* (2019.01); *H04W 4/027* (2013.01)

(58) Field of Classification Search
CPC .. G06T 15/10; G06T 7/60; G06T 7/70; G06T 19/006; G06F 3/011
See application file for complete search history.

(56) References Cited

U.S. PATENT DOCUMENTS 4,462,165 A 7/1984 Lewis
5,280,265 A 1/1994 Kramer et al.
(Continued)

FOREIGN PATENT DOCUMENTS

CA 2142338 3/1994
CA 2358682 3/1994
(Continued)

OTHER PUBLICATIONS

Non-Final Office Action for U.S. Appl. No. 14/641,376 dated Apr. 14, 2016.
(Continued)

*Primary Examiner* — Abderrahim Merouan
(74) *Attorney, Agent, or Firm* — Vista IP Law Group, LLP

(57) ABSTRACT

To enable shared user experiences using augmented reality systems, shared reference points must be provided to have consistent placement (position and orientation) of virtual objects. Furthermore, the position and orientation (pose) of the users must be determinable with respect to the same shared reference points. However, without highly sensitive and expensive global positioning system (GPS) devices, pose information can be difficult to determine to a reasonable level of accuracy. Therefore, what is provided is an alternative approach to determining pose information for augmented reality systems, which can be used to perform location based content acquisition and sharing. Further, what is provided is an alternative approach to determining pose information for augmented reality systems that uses information from already existing GPS devices.

18 Claims, 24 Drawing Sheets

Related U.S. Application Data

(60) Provisional application No. 62/449,512, filed on Jan. 23, 2017.

(51) Int. Cl.
  *G06F 3/01* (2006.01)
  *G06F 16/907* (2019.01)

(56) References Cited

U.S. PATENT DOCUMENTS

| | | | |
|---|---|---|---|
| 5,583,974 A | 12/1996 | Winner et al. | |
| 5,592,401 A | 1/1997 | Kramer | |
| 5,684,498 A | 11/1997 | Welch et al. | |
| 5,784,115 A | 7/1998 | Bozdagi | |
| 5,930,741 A | 7/1999 | Kramer | |
| 6,377,401 B1 | 4/2002 | Bartlett | |
| 6,407,736 B1 | 6/2002 | Regan | |
| 6,701,296 B1 | 3/2004 | Kramer et al. | |
| 6,891,533 B1 | 5/2005 | Alcorn et al. | |
| 7,375,529 B2 | 5/2008 | Dupuis et al. | |
| 7,443,154 B1 | 10/2008 | Merewether et al. | |
| 8,165,352 B1 | 4/2012 | Mohanty et al. | |
| 8,401,308 B2 | 3/2013 | Nakamura et al. | |
| 8,446,426 B2 | 5/2013 | Gonion | |
| 8,950,867 B2 | 2/2015 | Macnamara | |
| 8,989,775 B2* | 3/2015 | Shaw | G06T 7/77 455/456.1 |
| 9,013,505 B1* | 4/2015 | Thornton | G06F 3/147 345/629 |
| 9,160,727 B1 | 10/2015 | Saylor et al. | |
| 9,215,293 B2 | 12/2015 | Miller | |
| 9,417,452 B2 | 8/2016 | Schowengerdt et al. | |
| 9,465,129 B1 | 10/2016 | Olsson et al. | |
| 9,639,935 B1 | 5/2017 | Douady-Plevin et al. | |
| 9,671,566 B2 | 6/2017 | Abovitz et al. | |
| 9,791,700 B2 | 10/2017 | Schowengerdt | |
| 9,814,430 B1 | 11/2017 | Berme et al. | |
| 9,874,749 B2 | 1/2018 | Bradski et al. | |
| 9,952,673 B2 | 4/2018 | Kramer et al. | |
| 10,130,429 B1 | 11/2018 | Weir | |
| 10,481,689 B1 | 11/2019 | Jeromin | |
| 10,721,280 B1 | 7/2020 | Heppner et al. | |
| 10,843,067 B1 | 11/2020 | Peuhkurinen et al. | |
| 2001/0043738 A1 | 11/2001 | Sawney et al. | |
| 2002/0033803 A1 | 3/2002 | Holzrichter et al. | |
| 2002/0180727 A1 | 12/2002 | Guckenberger et al. | |
| 2003/0052965 A1 | 3/2003 | Junkins et al. | |
| 2003/0092448 A1 | 5/2003 | Forstrom et al. | |
| 2003/0120448 A1 | 7/2003 | Moriya et al. | |
| 2003/0234823 A1 | 12/2003 | Sato et al. | |
| 2004/0140949 A1 | 7/2004 | Takagi | |
| 2004/0174337 A1 | 9/2004 | Kubota et al. | |
| 2004/0201857 A1 | 10/2004 | Foxlin | |
| 2005/0107870 A1 | 5/2005 | Wang et al. | |
| 2005/0156601 A1 | 7/2005 | Dupuis et al. | |
| 2006/0161871 A1 | 7/2006 | Hotelling et al. | |
| 2006/0253804 A1 | 11/2006 | Fukushima et al. | |
| 2007/0049374 A1 | 3/2007 | Ikeda et al. | |
| 2007/0072674 A1 | 3/2007 | Ohta et al. | |
| 2007/0126733 A1 | 6/2007 | Yang et al. | |
| 2007/0273644 A1 | 11/2007 | Mondine Natucci | |
| 2007/0298883 A1 | 12/2007 | Feldman et al. | |
| 2008/0024523 A1 | 1/2008 | Tomite et al. | |
| 2008/0133521 A1* | 6/2008 | Podilchuk | G06K 9/6857 |
| 2008/0275667 A1 | 11/2008 | Ohta | |
| 2008/0309884 A1 | 12/2008 | O'Dor et al. | |
| 2009/0005166 A1 | 1/2009 | Sato | |
| 2009/0051653 A1 | 2/2009 | Barney et al. | |
| 2009/0115406 A1 | 5/2009 | Anderson et al. | |
| 2009/0173886 A1 | 7/2009 | Chowdhury | |
| 2009/0184825 A1 | 7/2009 | Anderson | |
| 2010/0066676 A1 | 3/2010 | Kramer et al. | |
| 2010/0085423 A1 | 4/2010 | Lange | |
| 2010/0103205 A1 | 4/2010 | Lisaka et al. | |
| 2010/0141261 A1 | 7/2010 | Overby et al. | |
| 2010/0277476 A1 | 11/2010 | Johansson et al. | |
| 2010/0302152 A1 | 12/2010 | Kirigaya | |
| 2010/0309292 A1 | 12/2010 | Ho et al. | |
| 2011/0018874 A1 | 1/2011 | Hasselgreen et al. | |
| 2011/0025603 A1 | 2/2011 | Underkoffler et al. | |
| 2011/0184950 A1 | 7/2011 | Skaff et al. | |
| 2011/0199088 A1 | 8/2011 | Bittar et al. | |
| 2011/0238399 A1 | 9/2011 | Ophir et al. | |
| 2011/0248987 A1 | 10/2011 | Mitchell | |
| 2011/0263329 A1 | 10/2011 | Miyazaki et al. | |
| 2011/0298748 A1 | 12/2011 | Chen et al. | |
| 2012/0038549 A1 | 2/2012 | Mandella et al. | |
| 2012/0099800 A1* | 4/2012 | Llano | G06F 16/58 382/224 |
| 2012/0117076 A1 | 5/2012 | Austermann et al. | |
| 2012/0194516 A1 | 8/2012 | Newcombe et al. | |
| 2012/0236030 A1 | 9/2012 | Border et al. | |
| 2012/0328196 A1 | 12/2012 | Kasahara et al. | |
| 2013/0002614 A1 | 1/2013 | Nowatzyk et al. | |
| 2013/0083011 A1 | 4/2013 | Geisner et al. | |
| 2013/0084984 A1 | 4/2013 | Gagner et al. | |
| 2013/0117377 A1 | 5/2013 | Miller | |
| 2013/0128230 A1 | 5/2013 | Macnamara | |
| 2013/0169626 A1 | 7/2013 | Balan et al. | |
| 2013/0225199 A1* | 8/2013 | Shaw | G06T 7/292 455/456.1 |
| 2013/0230211 A1 | 9/2013 | Tanabiki et al. | |
| 2013/0241773 A1 | 9/2013 | Laine | |
| 2013/0278635 A1 | 10/2013 | Maggiore | |
| 2013/0290222 A1 | 10/2013 | Gordo et al. | |
| 2013/0312009 A1 | 11/2013 | Kramer et al. | |
| 2013/0321462 A1 | 12/2013 | Salter et al. | |
| 2013/0346168 A1 | 12/2013 | Zhou et al. | |
| 2014/0006026 A1 | 1/2014 | Lamb et al. | |
| 2014/0011589 A1 | 1/2014 | Barney et al. | |
| 2014/0037140 A1 | 2/2014 | Benhimane et al. | |
| 2014/0062841 A1 | 3/2014 | Ishikawa et al. | |
| 2014/0075060 A1 | 3/2014 | Sharp et al. | |
| 2014/0080428 A1* | 3/2014 | Rhoads | G06F 16/5838 455/88 |
| 2014/0119598 A1* | 5/2014 | Ramachandran | G06T 7/579 382/103 |
| 2014/0139226 A1 | 5/2014 | Jaaskelainen et al. | |
| 2014/0145932 A1 | 5/2014 | Underkoffler et al. | |
| 2014/0176591 A1 | 6/2014 | Klein et al. | |
| 2014/0181587 A1 | 6/2014 | Sridharan et al. | |
| 2014/0195988 A1 | 7/2014 | Kramer et al. | |
| 2014/0212027 A1 | 7/2014 | Hallquist et al. | |
| 2014/0222409 A1 | 8/2014 | Efrat et al. | |
| 2014/0225822 A1 | 8/2014 | Underkoffler et al. | |
| 2014/0267420 A1 | 9/2014 | Schowengerdt et al. | |
| 2014/0267646 A1 | 9/2014 | Na'Aman et al. | |
| 2014/0285375 A1 | 9/2014 | Crain | |
| 2014/0298269 A1 | 10/2014 | Underkoffler et al. | |
| 2014/0306866 A1 | 10/2014 | Miller et al. | |
| 2014/0321702 A1 | 10/2014 | Schmalstieg | |
| 2014/0323148 A1* | 10/2014 | Schmalstieg | G01C 21/20 455/456.1 |
| 2014/0325373 A1 | 10/2014 | Kramer et al. | |
| 2014/0354548 A1 | 12/2014 | Lee | |
| 2015/0002542 A1 | 1/2015 | Chan et al. | |
| 2015/0016777 A1 | 1/2015 | Abovitz et al. | |
| 2015/0019651 A1 | 1/2015 | Kazi et al. | |
| 2015/0040074 A1 | 2/2015 | Hofmann et al. | |
| 2015/0070347 A1* | 3/2015 | Hofmann | G06T 19/006 345/419 |
| 2015/0077326 A1 | 3/2015 | Kramer et al. | |
| 2015/0092015 A1 | 4/2015 | Stafford | |
| 2015/0100380 A1 | 4/2015 | Jones, Jr. et al. | |
| 2015/0100593 A1 | 4/2015 | Underkoffler et al. | |
| 2015/0161476 A1 | 6/2015 | Kurz et al. | |
| 2015/0163345 A1 | 6/2015 | Cornaby et al. | |
| 2015/0172568 A1 | 6/2015 | Choe et al. | |
| 2015/0177831 A1 | 6/2015 | Chan et al. | |
| 2015/0178554 A1 | 6/2015 | Kanaujia et al. | |
| 2015/0178939 A1 | 6/2015 | Bradski et al. | |
| 2015/0205126 A1 | 7/2015 | Schowengerdt | |
| 2015/0205364 A1 | 7/2015 | Underkoffler et al. | |
| 2015/0205388 A1 | 7/2015 | Osterhout | |

(56) References Cited

U.S. PATENT DOCUMENTS

| | | |
|---|---|---|
| 2015/0215611 A1 | 7/2015 | Wu et al. |
| 2015/0221133 A1 | 8/2015 | Groten et al. |
| 2015/0234477 A1 | 8/2015 | Abovitz et al. |
| 2015/0243080 A1 | 8/2015 | Steinbach et al. |
| 2015/0262372 A1 | 9/2015 | Cardoso et al. |
| 2015/0301592 A1 | 10/2015 | Miller |
| 2015/0302652 A1 | 10/2015 | Miller et al. |
| 2015/0309264 A1 | 10/2015 | Abovitz et al. |
| 2015/0309563 A1 | 10/2015 | Connor |
| 2015/0310310 A1 | 10/2015 | Hesch |
| 2015/0324198 A1 | 11/2015 | Alsup et al. |
| 2015/0339857 A1 | 11/2015 | O'Connor et al. |
| 2015/0346495 A1 | 12/2015 | Welch et al. |
| 2015/0358539 A1 | 12/2015 | Catt |
| 2015/0371082 A1 | 12/2015 | Csaszar et al. |
| 2015/0373369 A1 | 12/2015 | Jalai et al. |
| 2015/0379772 A1 | 12/2015 | Hoffman |
| 2016/0005233 A1 | 1/2016 | Fraccaroli et al. |
| 2016/0012643 A1 | 1/2016 | Kezele et al. |
| 2016/0016752 A1 | 1/2016 | Helseth et al. |
| 2016/0018896 A1 | 1/2016 | Kramer et al. |
| 2016/0021511 A1 | 1/2016 | Jin et al. |
| 2016/0026253 A1 | 1/2016 | Bradski et al. |
| 2016/0041048 A1 | 2/2016 | Blum et al. |
| 2016/0098095 A1 | 4/2016 | Gonzalez-Banos et al. |
| 2016/0117822 A1* | 4/2016 | Yii .................. G06T 7/77 382/107 |
| 2016/0147065 A1 | 5/2016 | Border et al. |
| 2016/0171644 A1 | 6/2016 | Gruber |
| 2016/0180151 A1 | 6/2016 | Philbin et al. |
| 2016/0180592 A1 | 6/2016 | Bean et al. |
| 2016/0189680 A1 | 6/2016 | Paquette |
| 2016/0203624 A1 | 7/2016 | Anderson |
| 2016/0210783 A1 | 7/2016 | Tomlin et al. |
| 2016/0259032 A1 | 9/2016 | Hehn |
| 2016/0259404 A1 | 9/2016 | Woods |
| 2016/0262608 A1 | 9/2016 | Krueger |
| 2016/0282619 A1 | 9/2016 | Oto |
| 2016/0294958 A1 | 10/2016 | Zhang et al. |
| 2016/0299567 A1 | 10/2016 | Crisler et al. |
| 2016/0327789 A1 | 11/2016 | Klug et al. |
| 2016/0378863 A1 | 12/2016 | Shlens et al. |
| 2016/0379092 A1 | 12/2016 | Kutliroff |
| 2017/0011555 A1 | 1/2017 | Li et al. |
| 2017/0032220 A1 | 2/2017 | Medasani et al. |
| 2017/0076328 A1 | 3/2017 | Suzuki |
| 2017/0098406 A1 | 4/2017 | Kobayashi |
| 2017/0109916 A1 | 4/2017 | Kurz et al. |
| 2017/0126988 A1* | 5/2017 | Holzer .................. G06T 15/205 |
| 2017/0148206 A1 | 5/2017 | Donner et al. |
| 2017/0160798 A1 | 6/2017 | Lanman et al. |
| 2017/0161853 A1 | 6/2017 | Gossweiler et al. |
| 2017/0161919 A1 | 6/2017 | Schroeder |
| 2017/0184387 A1 | 6/2017 | Lefevre et al. |
| 2017/0205903 A1 | 7/2017 | Miller et al. |
| 2017/0213473 A1 | 7/2017 | Ribeira et al. |
| 2017/0243324 A1 | 8/2017 | Mierle et al. |
| 2017/0244811 A1 | 8/2017 | Mckenzie et al. |
| 2017/0345220 A1 | 11/2017 | Bates |
| 2017/0345398 A1 | 11/2017 | Fuchs et al. |
| 2017/0359570 A1* | 12/2017 | Holzer .................. H04N 13/349 |
| 2018/0039083 A1 | 2/2018 | Miller et al. |
| 2018/0047332 A1 | 2/2018 | Kuwahara |
| 2018/0054712 A1* | 2/2018 | Ahuja .................. H04W 4/023 |
| 2018/0107346 A1 | 4/2018 | Wilson |
| 2018/0213359 A1 | 7/2018 | Reinhardt et al. |
| 2018/0267309 A1 | 9/2018 | Klug et al. |
| 2018/0268518 A1 | 9/2018 | Nourai et al. |
| 2018/0268519 A1 | 9/2018 | Liebenow et al. |
| 2018/0268610 A1 | 9/2018 | Nourai et al. |
| 2018/0365882 A1 | 12/2018 | Croxsford et al. |
| 2019/0015167 A1 | 1/2019 | Draelos et al. |
| 2019/0056693 A1 | 2/2019 | Gelman et al. |
| 2019/0064526 A1 | 2/2019 | Connor |
| 2019/0066365 A1 | 2/2019 | Schmalstieg et al. |
| 2019/0155374 A1 | 5/2019 | Miller et al. |
| 2019/0333263 A1 | 10/2019 | Melkote Krishnaprasad et al. |
| 2019/0355176 A1 | 11/2019 | Evans |
| 2020/0005517 A1 | 1/2020 | Anderson et al. |
| 2020/0027194 A1 | 1/2020 | Nourai et al. |
| 2020/0184712 A1 | 6/2020 | Schmalstieg et al. |
| 2020/0209978 A1 | 7/2020 | Pahud et al. |

FOREIGN PATENT DOCUMENTS

| | | |
|---|---|---|
| CN | 101093586 | 12/2007 |
| CN | 101530325 | 9/2009 |
| CN | 103792661 | 5/2014 |
| CN | 104011788 | 8/2014 |
| EP | 2887311 | 6/2015 |
| JP | 2007-128009 | 5/2007 |
| JP | 2012-43308 | 3/2012 |
| JP | 2012-96027 | 5/2012 |
| JP | 2015-52832 | 3/2015 |
| JP | 2016-528476 | 9/2016 |
| KR | 10-2014-0034252 | 3/2014 |
| KR | 10-2016-0013939 | 2/2016 |
| KR | 10-2016-0023888 | 2/2016 |
| WO | WO 94/04938 | 3/1994 |
| WO | WO 2009/091563 | 7/2009 |
| WO | WO 2014/160342 | 10/2014 |
| WO | WO 2015134958 | 9/2015 |
| WO | WO 2016/038240 | 3/2016 |
| WO | WO 2016141373 | 9/2016 |
| WO | WO 2017096396 | 6/2017 |
| WO | WO 2017136833 | 8/2017 |
| WO | WO 9720244 | 12/2019 |
| WO | WO 2020/023383 | 1/2020 |

OTHER PUBLICATIONS

Response to Non-Final office action filed Sep. 12, 2016 for U.S. Appl. No. 14/641,376.

Final Office Action for U.S. Appl. No. 14/641,376 dated Nov. 14, 2016.

Response to Final Office action filed Mar. 14, 2017 for U.S. Appl. No. 14/641,376.

PCT International Search Report and Written Opinion for International Appln. No. PCT/US15/19339, Applicant Magic Leap, Inc., Forms PCT/ISA/210, 220, and 237, dated Jun. 24, 2015 (10 pages).

PCT International Search Report and Written Opinion for International Appln. No. PCT/US16/21095, Applicant Magic Leap, Inc., forms PCT/ISA/210, 220, and 237, dated May 31, 2016 (12 pages).

PCT International Search Report and Written Opinion for International Appln. No. PCT/US16/65001, Applicant Magic Leap, Inc., forms PCT/ISA/210, 220, and 237, dated Feb. 16, 2017 (16 pages).

PCT International Search Report and Written Opinion for International Appln. No. PCT/US2017/016722, Applicant Magic Leap, Inc., forms PCT/ISA/210, 220, and 237, dated Apr. 14, 2017 (24 pages).

Notice of Allowance dated Aug. 14, 2017 for U.S. Appl. No. 14/641,376.

Preliminary Amendment filed Aug. 24, 2017 for U.S. Appl. No. 15/425,837.

Non-Final Office Action dated Dec. 6, 2017 for U.S. Appl. No. 15/062,104.

Voluntary Amendment for Canadian Appln. No. 2979560 filed Oct. 6, 2017, 24 pages.

Voluntary Amendment for Japanese Appln. No. 2017-546703 filed Nov. 7, 2017, 7 pages.

Response to Non-Final office action filed Mar. 6, 2018 for U.S. Appl. No. 15/062,104.

Final Office Action filed Apr. 30, 2018 for U.S. Appl. No. 15/062,104.

Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.

Non-Final Office Action dated Apr. 5, 2018 for U.S. Appl. No. 15/425,837.

(56) References Cited

OTHER PUBLICATIONS

Response to Non-Final Office Action filed Jul. 5, 2018 for U.S. Appl. No. 15/425,837.
Pre appeal brief filed Aug. 30, 2018 for U.S. Appl. No. 15/062,104.
Notice of Allowance dated Sep. 6, 2018 for U.S. Appl. No. 15/425,837.
Extended European Search Report dated Oct. 16, 2018 for EP Application No. 16759643.6.
Amendment After Allowance dated Nov. 15, 2018 for U.S. Appl. No. 15/425,837.
Non final Office Action dated Nov. 29, 2018 for U.S. Appl. No. 15/369,646.
Extended European Search Report dated Jan. 7, 2019 for EP Application No. 16871733.8.
Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.
Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.
Bay Herbert et al.: SURF: Speeded Up Robust Features, International Conference on Simulation, Modeling and Programming for Autonomous Robots, Simpar 2010, Lecture Notes in Computer Science; Lect Notes Computer; May 7, 2006, pp. 404-417, XP047429677.
Alex Kendall et al.: PoseNet: A Convolutional Metwork for Real-Time 6-DOF Camera Relocalization,https://arxiv.org/pdf/1505.07427v3.pdf, Nov. 23, 2015; XP055536871.
Extended European Search Report dated Jan. 17, 2019 for EP Application No. 17748352.6.
Nair Rahul et al.: "A Survey on Time-of-Flight Stero Fusion", Oct. 9, 2015, Medical Image Computing and Computer Assisted Intervention—MICCAI 2015, 18th International Conference, Munich, Germany, Oct. 5-9, 2015; Proceedings; Lecture Notes in Computer Science; Lect Notes Computer; Springer International Publishing, CH, XP047148654.
Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
Amendment After Non-Final Office Action dated Feb. 28, 2019 for U.S. Appl. No. 15/369,646.
PCT International Search Report and Written Opinion for International Appln. No. PCT/US18/22884, Applicant Magic Leap, Inc., forms PCT/ISA/210, 220, and 237, dated May 21, 2018 (13 pages).
Non-Final Office Action for U.S. Appl. No. 15/923,560 dated Jan. 2, 2019.
Amendment Response to Non-Final Office Action for U.S. Appl. No. 15/923,560 dated Apr. 1, 2019.
PCT International Search Report and Written Opinion for International Appln. No. PCT/US18/22993, Applicant Magic Leap, Inc., forms PCT/ISA/210, 220, and 237, dated Jun. 8, 2018 (13 pages).
PCT Invitation to Pay Additional Fees for International Appln. No. PCT/US18/23011, Applicant Magic Leap, Inc. dated May 25, 2018 (18 pages).
PCT International Search Report and Written Opinion for International Appln. No. PCT/US18/23011, Applicant Magic Leap, Inc. dated Jul. 23, 2018 (18 pages).
Non-Final Office Action for U.S. Appl. No. 15/924,078 dated Mar. 21, 2019.
Reply brief filed May 6, 2019 for U.S. Appl. No. 15/062,104.
Response to Extended European Search Report dated May 13, 2019 for EP Application No. 16759643.6.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Final Office Action dated Jun. 21, 2019 for U.S. Appl. No. 15/369,646.
Response to Non-Final Office Action filed Jun. 21, 2019 for U.S. Appl. No. 15/924,078.
Response to Restriction Requirement filed Jul. 22, 2019 for U.S. Appl. No. 15/877,359.
Final Office Action for U.S. Appl. No. 15/923,560 dated Jul. 11, 2019.
Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017 (8 pages).
Response to Extended European Search Report dated Jul. 30, 2019 for European Application No. 16871733.8, (12 pages).
Final Office Action for U.S. Appl. No. 15/924,078 dated Aug. 9, 2019.
Response to Final Office Action and AFCP for U.S. Appl. No. 15/369,646, filed Aug. 21, 2019.
Response Non Final Office action filed Sep. 12, 2019 for U.S. Appl. No. 15/924,011.
Advisory Action dated Sep. 6, 2019 for U.S. Appl. No. 15/369,646.
RCE and Response to Final Office Action for U.S. Appl. No. 15/369,646, filed Sep. 19, 2019.
Office Action for Chinese Appln. No. 201680025479.1 dated Jul. 23, 2019, 16 pages w/English translation.
Response to Final Office Action and AFCP for U.S. Appl. No. 15/924,078, filed Oct. 9, 2019.
Response to Final Office Action for U.S. Appl. No. 15/923,560, filed Oct. 10, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Advisory Action dated Oct. 22, 2019 for U.S. Appl. No. 15/924,078.
Non-Final Office Action dated Oct. 30, 2019 for U.S. Appl. No. 16/220,617.
Non-Final Office Action dated Oct. 31, 2019 for U.S. Appl. No. 15/923,560.
RCE and Response to Final Office Action filed Nov. 11, 2019 for U.S. Appl. No. 15/924,078.
Non Final Office Action dated Nov. 8, 2019 for U.S. Appl. No. 15/369,646.
Final office action dated Aug. 9, 2019 for for U.S. Appl. No. 15/924,078.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335, filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrived electronically on Apr. 12, 2019 (5 pages).

(56) References Cited

OTHER PUBLICATIONS

Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments : Scalable algorithm for resolving incorrect occlusion", Computer-Aided Civil and Infrastructure Engineering, vol . 25, No. I, Jan. 1, 2010, pp. 3-19, XP55640847.
Breen D E et al: "Interactive occlusion 1-14 and automatic object placement for augmented reality", Computer Graphics Forum, Wiley-Blackwell Publishing Ltd, GB, vol. 15, No. 3, Aug. 26, 1996, pp. 11-22, XP002515919.
Mark WR et al: "Post-Rendering 3D 1-14 Warping", Proceedings of 1997 Symposium on Interactive 3 D Graphics Apr. 27-30, 1997 Providence, RI, USA; ACM, New York, NY, USA, Apr. 27, 1997, pp. 7-16, XP000725355.
Amendment After Final Office Action for U.S. Appl. No. 15/924,011 dated Dec. 19, 2019.
Non-Final Office Action for U.S. Appl. No. 16/22,630 dated Dec. 26, 2019.
Non-Final Office Action for U.S. Appl. No. 15/924,078 dated Jan. 13, 2020.
Extended European Search Report for European Appln. No. 18742228.2 dated Jan. 13, 2020 (8 pages).
Amendment After non-final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).
Amendment After non-final Office Action for U.S. Appl. No. 16/220,617 dated Jan. 30, 2020.
Amendment After non-final Office Action for U.S. Appl. No. 15/923,560 dated Jan. 31, 2020.
Response to Examination Report filed Feb. 11, 2020 for European Application No. 16759643.6.
Amendment After non-final Office Action for U.S. Appl. No. 15/369,646 dated Feb. 10, 2020.
Notice of Allowance for U.S. Appl. No. 16/220,617 dated Feb. 20, 2020.
Response to Office Action filed Feb. 20, 2020 for Israeli Patent Application No. 254300, (3 pages).
Foreign Office Action for Japanese Patent Appln. No. 2017-546703 dated Mar. 10, 2020.
Amendment After non-final Office Action for U.S. Appl. No. 15/924,078 dated Apr. 13, 2020.
Notice of Allowance for U.S. Appl. No. 15/369,646 dated Apr. 8, 2020.
Final Office Action for U.S. Appl. No. 15/877,359 dated Apr. 16, 2020.
Foreign Office Action for Israeli Patent Application No. 259766 dated Mar. 1, 2020.
Amendment After non-final Office Action for U.S. Appl. No. 16/220,630 dated Apr. 27, 2020.
Non-Final Office Action for U.S. Appl. No. 16/848,496 dated May 18, 2020.
Notice of Allowance for U.S. Appl. No. 15/923,560 dated May 19, 2020.
Notice of Allowance for U.S. Appl. No. 15/924,078 dated May 18, 2020.
Foreign Office Action for CN Patent Appln. No. 201680025479.1 dated Apr. 7, 2020.
Jiang, P., etc., "Electro-magnetic Tracking System for Capsule-typed Telemetric Device", Optics and Precision Engineering, vol. 15, No. 8, pp. 1247-1252, Aug. 2007.
1st Examination Report dated Jun. 24, 2020 for New Zealand Patent Application No. 743271.

Foreign Office Action for CN Patent Appln. No. 201680025479.1 dated Jun. 18, 2020.
Notice of Allowance for U.S. Appl. No. 16/220,630 dated Jun. 8, 2020.
Response to Extended European Search Report for European Appln. No. 18767086.4 filed Jun. 15, 2020 (84 pages).
Response to Extended European Search Report for European Appln. No. 18766694.6 filed Jun. 19, 2020 (78 pages).
1st Examiner's Report for AU European Patent Appln. No. 2016225963 dated Jul. 1, 2020.
Foreign Office Action Response for JP Patent Appln. No. 2017-546703 dated Jun. 1, 2020.
Extended European Search Report for EP Patent Appln. No. 18768030.1 dated Jun. 18, 2020.
Mark, W., et al., "Post-Rendering 3D Warping", Proceedings of 1997 Symposium on 3D Graphics, Apr. 27-30, 1997, Providence, RI, USA, pp. 7-ff, XP058285072.
Amendment Response to Non-Final Office Action for U.S. Appl. No. 16/848,496 dated Jul. 22, 2019.
Foreign Exam Report for NZ Patent Appln. No. 735465 dated Jul. 22, 2020.
1st Examination Report for NZ Patent Appln. No. 734200 dated Jun. 15, 2020.
Foreign Submission Reply for EP Patent Appln No. 18766694.6 dated Jun. 19, 2020.
Foreign Examination Report for EP Patent Appln. No. 17837488.0 dated Jul. 22, 2020.
Response to Extended European Search Report for European Appln. No. 18742228.2 dated Aug. 10, 2020 (86 pages).
Notice of Allowance for U.S. Appl. No. 15/923,560 dated Aug. 25, 2020.
Notice of Allowance for U.S. Appl. No. 16/848,496 dated Aug. 24, 2020.
Foreign Office Action for KR Patent Appln. No. 10-2019-7006281 dated Aug. 28, 2020.
Non-Final Office Action for U.S. Appl. No. 16/945,613 dated Sep. 3, 2020.
Notice of Allowance for U.S. Appl. No. 16/220,630 dated Sep. 11, 2020.
Foreign Office Action for JP Patent Application No. 2019-505238 dated Sep. 10, 2020 (no translation available).
Notice of Allowance for U.S. Appl. No. 15/369,646 dated Sep. 22, 2020.
Notice of Allowance for U.S. Appl. No. 16/220,630 dated Sep. 23, 2020.
Non-Final Office Action for U.S. Appl. No. 16/809,346 dated Oct. 16, 2020.
1st Examination Report for AU Patent Appln. No. 2017214748 dated Oct. 14, 2020.
Non-Final Office Action for U.S. Appl. No. 16/518,431 dated Oct. 27, 2020.
Foreign Exam Report for EP Patent Appln. No. 18767086.4 dated Sep. 23, 2020.
Foreign Exam Report for EP Patent Appln. No. 18766694.6 dated Sep. 23, 2020.
N Stewart et ai: "An improved z-buffer CSG rendering algorithm", Proceedings of the Eurographics / SIGGRAPH Workshop on Graphics Hardware. Lisbon, Aug. 31-Sep. 1, 1998; pp. 25-30, XP058111343.
Wolberg G et ai: "Separable image warping with spatial lookup tables", Computer Graphics, ACM, US, vol. 23, No. 3, Jul. 1, 1989, pp. 369-378, XP058214788.
R T Stevens: "Primitive", In: "Quick Reference to Computer Graphics Terms A Division of Harcourt Brace & Company", Jan. 1, 1995, XP55730228, p. 166.
J D Foley: "The z-buffer algorithm", In: "Computer Graphics—Principles and Practice", Addison-Wesley, Jan. 1, 1990 (Jan. 1, 1990), XP55731635, pp. 668-672.
Notice of Allowance for U.S. Appl. No. 16/848,496 dated Nov. 2, 2020.
Foreign OA Response for KR Patent Appln. No. 10-2019-7006281 dated Oct. 28, 2020.
Notice of Allowance for U.S. Appl. No. 16/938,578 dated Nov. 19, 2020.

(56) References Cited

OTHER PUBLICATIONS

Foreign Exam Report for EP Patent Appln. No. 18742228.2 dated Oct. 1, 2020.
Foreign OA Response for EP Patent Appln. No. 17837488.0 dated Nov. 20, 2020.
Foreign OA Response for IL Patent Application No. 259766 dated Nov. 25, 2020.
1st Exam Report for AU Patent Application No. 2016365422 dated Nov. 4, 2020.
Foreign OA Response for JP Patent Application No. 2019-505238 dated Dec. 1, 2020.
Foreign Response for AU Patent Appln. No. 2018236457 dated Mar. 26, 2021.
Foreign Response for AU Patent Appln. No. 2017214748 dated Mar. 29, 2021.
Foreign Response for NZ Patent Appln. No. 735465 dated Mar. 31, 2021.
Foreign Response for AU Patent Appln. No. 2016225963 dated Mar. 31, 2021.
Foreign Response for EP Patent Appln. No. 18767086.4 dated Apr. 6, 2021.
Foreign Response for EP Patent Appln. No. 18766694.6 dated Apr. 6, 2021.
Foreign Response for EP Patent Appln. No. 16871733.8 dated May 17, 2021.
Foreign Exam Report for EP Patent Appln. No. 16759643.6 dated Apr. 29, 2021.
Foreign Response for AU Patent Appln. No. 2016365422 dated May 14, 2021.
Foreign Notice of Acceptance for AU Patent Appln. No. 2018210015 dated Mar. 24, 2021.
Foreign NOA for IL Patent Appln. No. 267946 dated Apr. 7, 2021.
Foreign Response for JP Patent Appln. No. 2018-540434 dated May 17, 2021.
Foreign Response for JP Patent Appln. No. 2019-505238 dated Apr. 16, 2021.
Foreign Response for JP Patent Appln. No. 2019-539183 dated May 17, 2021.
Foreign Response for JP Patent Appln. No. 2018-528977 dated May 13, 2021.
Foreign OA for KR Patent Appln. No. 10-2017-7028140 dated Apr. 21, 2021.
Foreign Response for CN Patent Appln. No. 201780010073.0 dated Jun. 4, 2021.
Foreign OA for CN Patent Appln. No. 201880018442.5 dated Apr. 1, 2021.
Foreign Exam Report for IN Patent Appln. No. 201847023727 dated Jun. 15, 2021.
Non-Final Office Action for U.S. Appl. No. 17/022,317 dated Jun. 10, 2021.
Foreign Final OA for JP Patent Appln. No. 2017-546703 dated Nov. 20, 2020.
Foreign OA For JP Patent Appln. No. 2019-505238 dated Jan. 12, 2021.
Foreign OA for JP Patent Appln. No. 2018-540434 dated Dec. 17, 2020.
Foreign Response for JP Patent Appln. No. 2019-510409 dated Jan. 28, 2021.
Foreign OA for JP Patent Appln. No. 2019-539183 dated Feb. 19, 2021.
Foreign OA for JP Patent Appln. No. 2018-528977 dated Feb. 16, 2021.
Foreign NOA for JP Patent Appln. No. 2019-539183 dated Jun. 21, 2021.
Foreign FOA for JP Patent Appln. No. 2018-528977 dated Jun. 7, 2021.
Foreign FOA for JP Patent Appln. No. 2018-540434 dated Jun. 14, 2021.
Foreign OA for JP Patent Appln. No. 2019-550189 dated Jul. 13, 2021.
Foreign OA for JP Patent Appln. No. 2019-505238 dated Jul. 2, 2021.
Foreign OA for KR Patent Appln. No. 10-2019-7006281 dated Dec. 15, 2020.
Foreign NOA for KR Patent Appln. No. 10-2019-7022837 dated Jan. 27, 2021.
Foreign Final OA for KR Patent Appln. No. 10-2019-7006281 dated Jan. 27, 2021.
Foreign Amendment for KR Patent Appln. No. 10-2017-7028140 dated Jun. 15, 2021.
Foreign OA for KR Patent Appln. No. 10-2019-7030322 dated Jul. 15, 2021.
Foreign NOA for IL Patent Application No. 259766 dated Nov. 29, 2020.
Foreign OA for IL Patent Appln. No. 254300 dated Nov. 15, 2020.
Foreign OA for IL Patent Appln. No. 260614 dated Mar. 22, 2021.
Foreign NOA for IL Patent Appln. No. 254300 dated Apr. 22, 2021.
Foreign Response for IL Patent Appln. No. 254300 dated Mar. 14, 2021.
Foreign Response for IL Patent Appln. No. 260614 dated Jul. 21, 2021.
Foreign OA for CN Patent Appln. No. 201780010073.0 dated Jan. 21, 2021.
Foreign Exam Report for IN Patent Appln. No. 201747032796 dated Mar. 10, 2021.
Foreign Exam Report for AU Patent Appln. No. 2017305227 dated Dec. 16, 2020.
Amendment Response to NFOA for U.S. Appl. No. 16/809,346 dated Jan. 11, 2020.
Response to Non-Final Office Action for U.S. Appl. No. 16/518,431, filed Jan. 27, 2021.
Foreign Response for NZ Patent Appln. No. 735465 dated Jan. 21, 2021.
Foreign Response for EP Patent Appln. No. 18742228.2 dated Feb. 11, 2021.
Foreign Response for EP Patent Appln. No. 18768030.1 dated Jan. 18, 2021.
Foreign Exam Report for EP Patent Appln. No. 16871733.8 dated Jan. 11, 2021.
Final Office Action for U.S. Appl. No. 16/518,431 dated Mar. 2, 2021.
Sumit Chopra et al., "Learning a Similarity Metric Discriminatively, with Application to Face Verification", 2005 IEEE Computer Society Conference on Computer Vision and Pattern Recognition (CVPR'05), US, IEEE, Jun. 20, 2005, vol. 1, pp. 539-546 (a document showing a well-known technique).
Florian Schroff et al., "FaceNet: A Unified Embedding for Face Recognition and Clustering", 2015 IEEE Conference on Computer Vision and Pattern Recognition (CVPR), US, IEEE, Jun. 7, 2015, pp. 815-823 (a document showing a well-known technique).
Notice of Allowance for U.S. Appl. No. 16/809,346 dated Mar. 22, 2021.
Foreign Exam Report for AU Patent Appln. No. 2018233733 dated Mar. 11, 2021.
Foreign Exam Report for AU Patent Appln. No. 2018236457 dated Mar. 10, 2021.
Foreign Exam Report for AU Patent Appln. No. 2018234921 dated Mar. 11, 2021.
Foreign Exam Report for AU Patent Appln. No. 2018210015 dated Feb. 23, 2021.
Foreign Response for AU Patent Appln. No. 2018210015 dated Mar. 12, 2021.
2nd Exam Report for EP Patent Appln. No. 17837488.0 dated May 28, 2021.
Non-Final Office Action for U.S. Appl. No. 16/518,431 dated Jun. 23, 2021.
RCE Response to Final Office Action for U.S. Appl. No. 16/518,431 dated Jun. 1, 2021.
Foreign Exam Report for CA Patent Appln. No. 2979560 dated Jun. 15, 2021.
Foreign Exam Report for EP Patent Appln. No. 2016365422 dated Jun. 11, 2021.

(56) References Cited

OTHER PUBLICATIONS

English Translation of Foreign OA for JP Patent Appln. No. 2019-550189 dated Jul. 8, 2021.
Foreign OA for JP Patent Appln. No. 2019-550231 dated Jul. 26, 2021.
Foreign OA for JP Patent Appln. No. 2019-550200 dated Jul. 26, 2021.
Foreign NOA for NZ Patent Appln. No. 735465 dated Jul. 22, 2021.
Non-Final Office Action for U.S. Appl. No. 16/922,145 dated Jul. 22, 2021.
Foreign Response for CN Patent Appln. No. 201880018442.5 dated Aug. 12, 2021.
Foreign OA for CN Patent Appln. No. 201780010073.0 dated Jul. 9, 2021.
Foreign NOA for KR Patent Appln. No. 10-2017-7028140 dated Aug. 23, 2021.
Foreign Exam Report for IN Patent Appln. No. 201947005860 dated Aug. 18, 2021.
Decision to Grant for EP Patent Appln. No. 18742228.2 dated Aug. 19, 2021.
Foreign Exam Report for AU Patent Appln. No. 2021204725 dated Aug. 24, 2021.
Foreign NOA for JP Patent Appln. No. 2018-548394 dated Sep. 7, 2021.
Foreign Response for EP Patent Appln. No. 16759643.6 dated Sep. 3, 2021.
Foreign Response for IN Patent Appln. No. 201747032796 dated Sep. 8, 2021.
Foreign Response for AU Patent Appln. No. 2018234921 dated Sep. 15, 2021.
Foreign Response for KR Patent Appln. No. 10-2019-7030322 dated Sep. 13, 2021.
Foreign Response for KR Patent Appln. No. 10-2019-7030321 dated Sep. 10, 2021.
Foreign Response for AU Patent Appln. No. 2016365422 dated Sep. 16, 2021.
Foreign Response for CN Patent Appln. No. 201780010073.0 dated Sep. 22, 2021.
Foreign Response for JP Patent Appln. No. 2019-505238 dated Sep. 27, 2021.
Foreign Response for KR Patent Appln. No. 10-2019-7029900 dated Sep. 17, 2021.
Foreign Exam Report for IN Patent Appln. No. 201847025793 dated Sep. 22, 2021.
Foreign Response for AU Patent Appln. No. 2018233733 dated Oct. 1, 2021.
Foreign NOA for JP Patent Appln. No. 2019-505238 dated Oct. 5, 2021.
Foreign Response for EP Patent Appln. No. 17837488.0 dated Oct. 5, 2021.
Foreign Response for JP Patent Appln. No. 2019-550189 dated Oct. 8, 2021.
Foreign Notice of Acceptance for AU Patent Appln. No. 2018234921 dated Sep. 27, 2021.
3rd Exam Report for AU Patent Appln. No. 2016365422 dated Oct. 11, 2021.
Foreign Notice of Appeal for JP Patent Appln. No. 2018-540434 dated Oct. 13, 2021.
Foreign Exam Report for EP Patent Appln. No. 18767086.4 dated Sep. 1, 2021.
Foreign Response for CA Patent Appln. No. 2979560 dated Oct. 13, 2021.
Foreign NOA for IL Patent Appln. No. 268916 dated Sep. 12, 2021.
Notice of Allowance for U.S. Appl. No. 17/022,317 dated Oct. 6, 2021.
Amendment Response to NFOA for U.S. Appl. No. 16/922,145 dated Oct. 18, 2021.
Foreign Response for AU Patent Appln. No. 2016365422 dated Oct. 22, 2021.
Foreign Response for JP Patent Appln. No. 2019-550200 dated Oct. 22, 2021.

* cited by examiner

LOCALIZATION DETERMINATION FOR MIXED REALITY SYSTEMS

CROSS-REFERENCE TO RELATED APPLICATIONS

This application is a continuation of U.S. patent application Ser. No. 15/877,359, filed on Jan. 22, 2018, entitled "LOCALIZATION DETERMINATION FOR MIXED REALTY SYSTEMS," which claims priority to U.S. Provisional Patent Application No. 62/449,512 filed on Jan. 23, 2017, entitled "LOCALIZATION DETERMINATION FOR MIXED REALITY SYSTEMS". The present application is related to U.S. patent application Ser. No. 14/690,401, filed Apr. 18, 2015, which claims priority from U.S. Provisional Patent App. Ser. No. 61/981,701 entitled "SYSTEMS AND METHOD FOR AUGMENTED AND VIRTUAL REALITY," filed Apr. 18, 2014 and U.S. Provisional Patent App. Ser. No. 62/012,273 entitled "METHODS AND SYSTEMS FOR CREATING VIRTUAL AND AUGMENTED REALITY," filed Jun. 14, 2014. The 14/690,401 application is also related to U.S. patent application Ser. No. 14/331,218 entitled "PLANAR WAVEGUIDE APPARATUS WITH DIFFRACTION ELEMENT(S) AND SYSTEM EMPLOYING SAME," filed Jul. 14, 2014. The contents of the above-listed patent applications are hereby expressly and fully incorporated by reference in their entirety, as though set forth in full.

FIELD OF THE INVENTION

The present disclosure generally relates to systems and methods for localization determination for information persistence and location based content sharing of interactive virtual or augmented reality environments for one or more users.

BACKGROUND

Augmented reality (AR) environments are generated by computers using, in part, data that describes the environment. This data may describe various objects (both virtual and physical) a user may sense and interact with. Examples of these objects include objects that are rendered and displayed for a user to see, audio that is played for a user to hear, and tactile (or haptic) feedback for a user to feel. Users may sense and interact with these AR environments through a variety of visual, auditory, and tactile methods.

Virtual reality (VR) or AR systems may be useful for many applications, spanning the fields of scientific visualization, medical training, military training, engineering design and prototyping, tele-manipulation and tele-presence, and personal entertainment to name a few. AR, in contrast to VR, comprises one or more virtual objects in relation to real objects of the physical world, e.g. virtual objects are positioned in relations to real objects of the physical world. This enhances the user's experience and enjoyment with AR devices and opens the door for a variety of applications that allow the user to experience real objects and virtual objects simultaneously.

However, there are significant challenges in providing an AR system. One preliminary challenge is how to determine the location of the user and device to a sufficient level of accuracy without requiring additional devices or hardware specifically directed towards addressing that problem, such as location beacons and/or GPS devices which add cost to the device and increase the overall size and power requirements.

Thus, there is a need for improved systems and methods for localization determination to provide location based content sharing of interactive AR environments for one or more users.

SUMMARY

Embodiments of the present disclosure are directed to improved devices, systems and methods for localization determination for location based content sharing of interactive virtual or augmented reality environments for one or more users.

Embodiments described herein provide augmented reality systems, typically with user worn components such as head worn displays. Embodiments provide processes and systems for determining the location of a user to enable location based content sharing such as interacting with one or more virtual objects that other users in the same area are also able to interact with.

In some embodiments, the location determination sequence is initiated based on one or more conditions. For example, the location determination sequence could be initiated on boot up, on a determination that the device does not know the area that it is in, on a determination that the device does not know its position and orientation, on the start of any application, on initiation by a user, or any combination thereof.

In some embodiments, an area localization process is performed that comprises collecting metadata at the user location and comparing that collected metadata with previously collected metadata. The collected metadata may correspond to any communications network, e.g. WiFi, Bluetooth, ZigBee, etc. Furthermore, the collected metadata may correspond to one way communications networks such as broadcast television and radio. The collected metadata may be compared to previously collected metadata locally, remotely, or some combination thereof. Additionally, the collected metadata may be processed using scores, weights, or confidence thresholds, where conflicts between local and remote determinations may be further processed/evaluated to resolve the conflicting results.

In some embodiments, the area localization process includes gathering metadata from devices that include a global positioning system (GPS). The metadata may include information pertaining to the devices, how the metadata was gathered and GPS data from the devices themselves. The GPS data may be processed using heuristics in order to determine a range of positions the augmented reality display device may be located in based on the GPS data and signal information pertaining to the medium/method of transfer (e.g. signal strength of a WiFi network). Furthermore, in some embodiments the heuristic processing may be extended to other networks such as WiFi networks where the location of a WiFi hotspot is known to within a given range and using other data such as signal strength to determine position information heuristically. However, in some embodiments, the metadata does not include information from any global positioning systems.

In some embodiments, a coarse localization process is performed. The coarse localization process operates via keyframe analysis to determine a keyframe that best matches a keyframe captured at the user device. For example, each map area may be associated with some number of previously captured keyframes taken at known positions and orientations (poses). Thus, a keyframe taken at the user device can be compared to the previously captured keyframes to determine how similar each of the previously captured keyframes is to the keyframe taken at the user device. Finally, the most similar keyframe, (e.g., the keyframe with the best similarity score), can be selected for further processing during the fine localization process. In some embodiments, the most similar keyframe is the also the nearest keyframe. However, in some embodiments the nearest keyframe may not be the most similar keyframe because the nearest keyframe captures a view that does not sufficiently overlap with the field of view of the keyframe captured at the user device.

In some embodiments, a fine localization process is performed. In some embodiments, the fine localization process uses the most similar keyframe identified in the previous step to determine the pose of the user device. First, the relative pose of the user device is determined with respect to the most similar keyframe through any known computer vision techniques. Second, the position of the augmented reality device with respect to an area origin is determined. This can be accomplished by chaining two transforms: one from an origin to a keyframe and one from the keyframe to augmented reality device. Therefore, the pose of the augmented reality device can be determined with respect to the map area origin. Furthermore, while the fine localization process is discussed here as a two step process, in some embodiments the process may be combined into a single step, or separated into a plurality of steps.

In some embodiments, the execution of the processes described above can be used to trigger location based content activities. For example, content acquisition can be triggered at the area localization process e.g. transfer of an application associated with a shopping mall when the area localization process determines that the user is in an area that corresponds to the shopping mall, at the coarse localization process e.g. transfer of an application associated with a movie theater when an identified best matching keyframe was captured within a given distance from a movie theater ticket window, or at the fine localization process e.g. transfer of a virtual menu application and ordering system for one or more nearby storefront. Furthermore, content sharing can be trigger during the location determination sequence. This process is similar to content acquisition, but for content transmitted from users in the area. For example, content sharing may be triggered at the level of an identified map area e.g. a street performer incorporating virtual objects in a public performance, content sharing may be triggered based on proximity to a best matching keyframe e.g. a movie theater transmitting virtual objects for a virtual quiz game to patrons waiting to enter the theater for a related movie, or based on an identified location e.g. the movie theater streaming special content to patrons that are identified to be within the movie theater itself where the content may even correspond to the specific movie ticket held.

In some embodiments, the location based content activities comprise one-way or two-way exchange of content between devices over a local communications network. For example, one-way exchange of content might comprise streaming from one device to one or many devices content such as presentation materials, whereas two-way exchange of content might comprise two or more people exchanging content to facilitate joint creation of presentation materials.

Additional and other objects, features, and advantages of the disclosure are described in the detail description, figures, and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Embodiments of the present disclosure are directed to improved devices, systems and methods for localization determination for location based content sharing of interactive virtual reality (VR) or augmented reality (AR) environments for one or more users.

Embodiments illustrated herein provide processes and systems for determining the location of a user to provide for location based content sharing such as interacting with one or more virtual objects that other users in the same area are also able to interact with.

Figure 1:
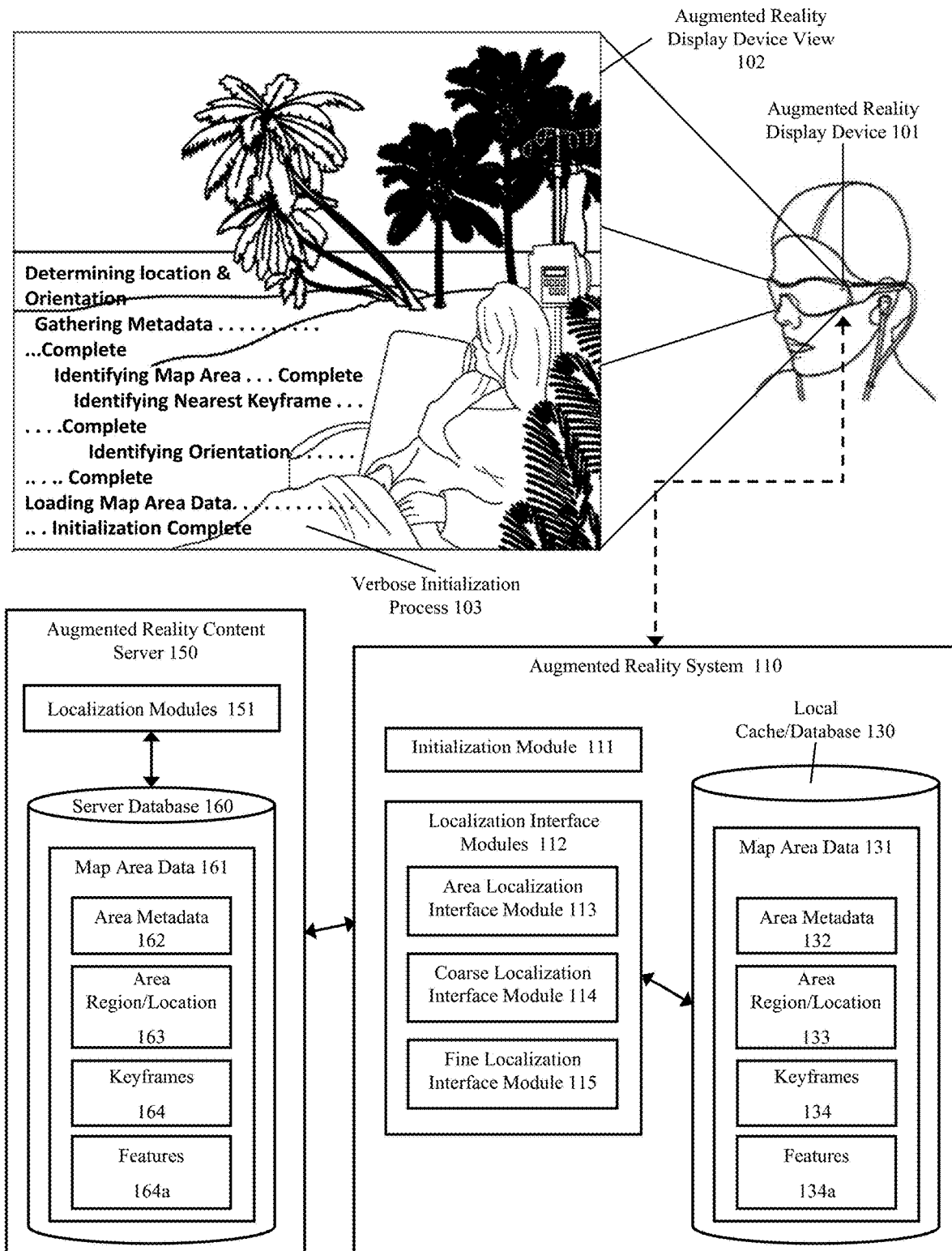
FIG. 1 illustrates an example environment in which location determination is performed for an augmented reality display device.

FIG. 1 illustrates an example environment in which location determination is performed for an AR display device. The example environment disclosed herein includes a system for determining a user location in order to share content, such as virtual objects and other virtually displayed content whether shared, streamed, or generated locally.

Augmented reality display device 101 presents an augmented reality view 102 to a user. Generally, AR comprises a view of some portion of a real world, with one or more virtual objects overlaid over that view, e.g. by projecting a virtual object onto a pair of AR glasses that reflect one or more displayed virtual objects into the eyes of the user, such that the virtual objects are placed in between the user and the real world. Furthermore, various devices and techniques can be used to make the virtual object appear within a specific location with respect to the real world. For instance, the depicted augmented reality display 101 could be used to display a gremlin riding waves on a surf board in the augmented reality display device view 102. Such a display might be facilitated by placing various sensors on the augmented reality display device 101, such as cameras on the left and right side of the glasses for stereo vision, an accelerometer, a magnetometer, and gyroscope for detection of movement and orientation. Further details regarding an exemplary augmented reality display device are described in U.S. patent application Ser. No. 14/555,585, filed Nov. 27 2014, which is hereby incorporated by reference in its entirety.

The augmented reality display device view 102 also includes a displayed verbose initialization process 103, which includes gathering metadata, identifying the map area, identifying a nearest keyframe and identifying orientation. This process will be discussed in more detail below. However, the process need not necessarily be shown to the users or in the alternative some portion/summary information thereof may be shown to users.

An augmented reality system 110 provides modules and database elements for a localization process. These modules and database elements may be implemented on a computing system such as that disclosed in FIG. 9 and the corresponding paragraphs herein. The modules and database elements themselves may comprise software, hardware, or some combination thereof. Such systems may be provided in a dedicated computing module that connects to the augmented reality display device 101—either wired or wirelessly, as part of the augmented reality display device 101 itself, as part of another system or computing device that connects to the augmented reality display device 101 and is connected either via wires or wirelessly, or any combination thereof.

The augmented reality system 110 initiates the localization process using an initialization module 111. For instance, the initialization module 111 may be used to make a determination as to whether the augmented reality display device 101 knows what area region/location the augmented reality display device 101 is in, whether the augmented reality display device 101 knows what keyframe is the closest keyframe, and whether the augmented reality display device 101 knows what orientation it is in with respect to an area region origin point. As a result, the initialization module 111 may trigger localization at the correct stage of the process, e.g. trigger area localization when the area is unknown or trigger coarse localization if the area is known but the orientation and closest keyframe is unknown. However, under most circumstances the augmented reality display device 101 will start the localization process with an area localization module (e.g., area localization interface module 113).

Localization interface modules 112 include an area localization interface module 113, a coarse localization interface module 114, and a fine localization interface module 115. Each module handles a different portion of the localization process in order to determine a current location and orientation with respect to an origin point for a particular area.

The area localization interface module 113 gathers relevant area metadata such as wireless network devices within range using any network supported by the augmented reality system 110. Wireless networks may include short range networks such as Bluetooth, and longer range networks such as WiFi. Furthermore, other wireless networking standards may be use such as WiMAX, ZigBee, or cellular networks. Furthermore, one way networks may also provide relevant metadata such as digital or analog television signals, radio signals, or any other signals that are associated with an area. During or after metadata is gathered it may be stored locally in an appropriate storage location, e.g. temporary memory or in a local cache/database 130. The metadata may be organized in a map area dataset 131 and into an area metadata portion 132. Additionally, the map area data 131 may comprise a temporary or working map area. For example the map area data 131 may correspond to a yet unidentified/undefined map area. Finally, the metadata may be transmitted to an augmented reality content server 150 for a determination of a map area that best matches the identified metadata. In some embodiments, the map area data that corresponds to the identified map area may be transmitted to the augmented reality system 110 to perform coarse localization and fine localization. In some embodiments, the coarse localization process may be executed at the augmented reality content server 150 or a device associated thereof. However, the present illustration provides for performing coarse localization and fine localization at the augmented reality system 110. The map area data 131 when populated includes at least an area region/location definition (such as an area boundary and topology data), and a set of keyframes associated with that area.

The coarse localization interface module 114 may receive the area region/location information and may store it appropriately, such as in the area region/location 133 within the local cache/database 130. The coarse localization interface module 114 may also receive keyframe information which may also be stored appropriately. For example, the coarse localization interface module 114 may receive keyframes 134 and store the keyframes 134 within the local cache/database 130. The coarse localization interface module 114 may determine features 134a of the keyframes 134 and store the features 134a within the local cache/database 130. Examples of features include edges, corners, blobs, ridges, and the like. The coarse localization interface module 114 may then capture a keyframe (e.g., a keyframe of the keyframes 134) and compare the captured keyframe to a set of keyframes (e.g., keyframes 164) and/or features (e.g., features 164a) thereof received from the augmented reality content server 150 to identify the nearest and/or best matching keyframe. In some embodiments, the coarse localization interface module 114 may compare the features 134a in the keyframes 134 to features 164a of keyframes 164 from a server database 160 of the augmented reality content server 150. However, the best matching keyframe may not always be the nearest keyframe. For example, if the nearest keyframe is situated such that it displays a view that is outside of the field of view of the augmented reality display device 101, then the keyframe captured using that augmented reality display device 101 will not find that the captured keyframe is similar to the nearest keyframe because the nearest keyframe captured is hidden from view. In some embodiments, the keyframes may be captured with a 360 degree or similar camera, or some combination of cameras to capture a field of view greater than that visible by the user. Further details of the process of identifying the nearest or best matching keyframe will be discussed below. Further details regarding keyframe processing are described in U.S. patent application Ser. No. 14/705,983 titled "CREATING A TOPOLOGICAL MAP FOR LOCALIZATION IN AUGMENTED OR VIRTUAL REALITY SYSTEMS", filed May 7 2015, which is hereby incorporated by reference in its entirety.

Once a nearest or best matching keyframe (herein matching keyframe) has been determined, then the fine locational interface module 115 can compare the matching keyframe to the keyframe captured using that augmented reality display device 101. Based on this comparison, the augmented reality system 110 can determine the pose (position and orientation) of the augmented reality display device 101. Determining the pose is generally performed in two steps. First, the relative pose is determined with respect to the keyframe. Second, the position of the augmented reality display device 101 with respect to a map area origin is determined. This can be accomplished by chaining two transforms: one from the map area origin to the keyframe and one from the keyframe to the augmented reality display device 101. Thus, the pose of the augmented reality display device 101 can be determined with respect to the map area origin. Therefore, to determine the map area origin of the augmented reality display device 101, the relative position with respect to a keyframe can be translated to a relative position with respect to the map area origin, which enables a shared user experience in a given area because multiple augmented reality display device users may interact with the same virtual object(s) in the same location with respect to the shared map area origin point and physical space.

The local cache/database 130 may comprise only nonvolatile storage—e.g. solid state drives, hard disk drives, or any other persistent rewritable media or medium. However, the local cache/database 130 may also comprise only volatile storage—e.g. random access memory (RAM), or in the alternative may comprise some combination of volatile and nonvolatile storage. Furthermore, the local cache/database 130 may be divided into different regions such as a volatile memory used to hold the map area data 131 for a working or current region and a nonvolatile portion for storing map area data for the current or working map area that does not need to be accessed as frequently or for storing map area data for map areas previously accessed or marked, such as a home office, business conference room, or other locations.

The augmented reality content server 150 has at least localization modules 151 and the server database 160. The localization modules 151 largely mirror the localization interface modules 112. However, the localization modules 151 will be discussed in more detail in regard to FIG. 2A.

The server database 160 is essentially the same as the local cache/database 130 with map area data 161 mirroring that of the map area data 131, area metadata 162 corresponding to the area metadata 132, area region/location 163 corresponding to the area region/location 133, keyframes 164 corresponding to the keyframes 134, and features 164*a* corresponding to the features 134*a*. However, the server database 160 may aggregate data from multiple sources not readily accessible by the augmented reality system 110 except through the augmented reality content server 150. For instance, the server database 160 may include metadata collected from other users, from other systems, and even from sources that are not augmented reality systems, e.g. mapping systems, and other data such as data that represents the physical location of different wireless networking devices, such as cell phone towers, WiFi hot spots, and broadcast media antennas.

Figure 2A:
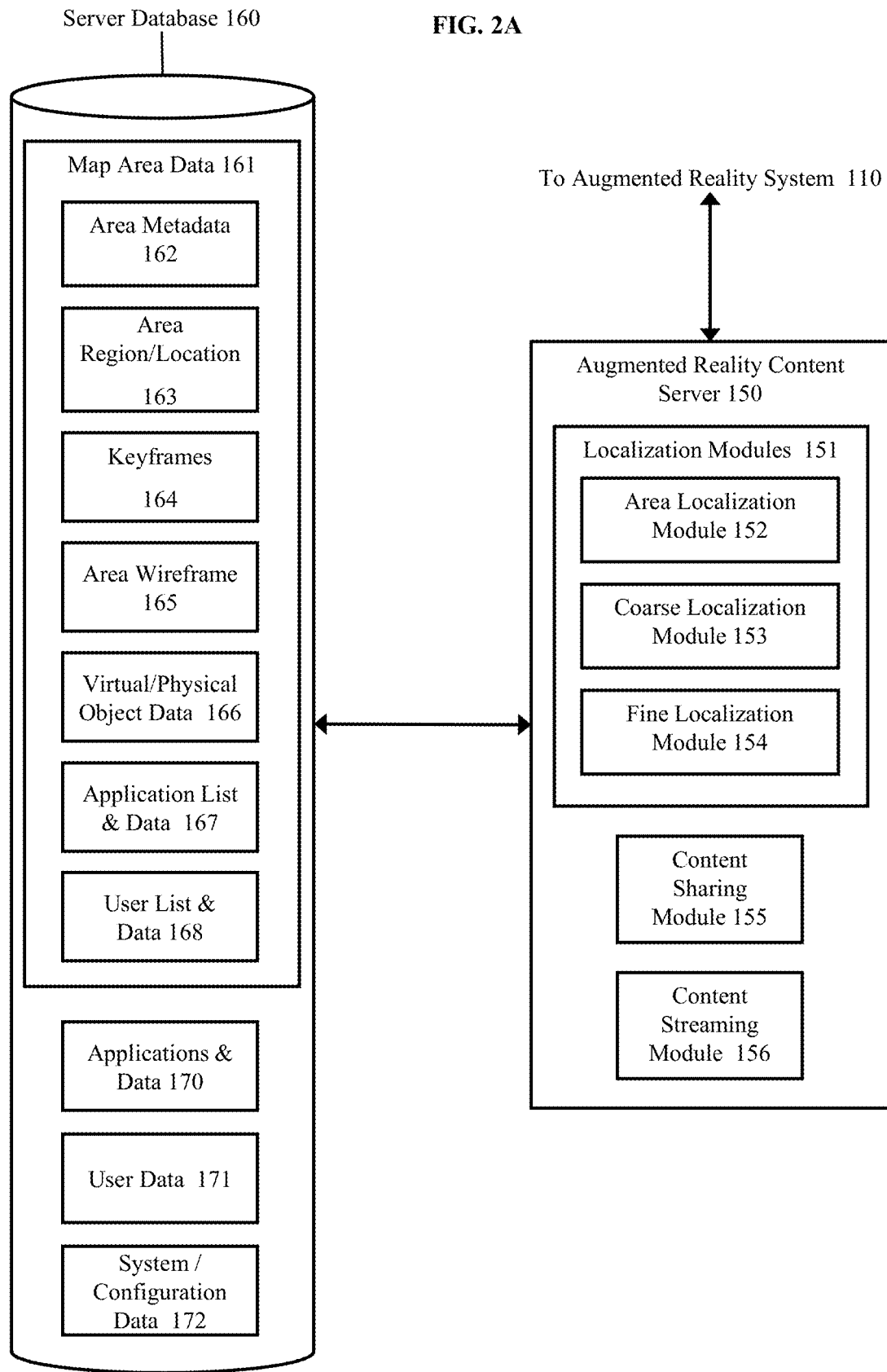
FIGS. 2A-B illustrate an example augmented reality content server and an augmented reality system, according to some embodiments.
Figure 2B:
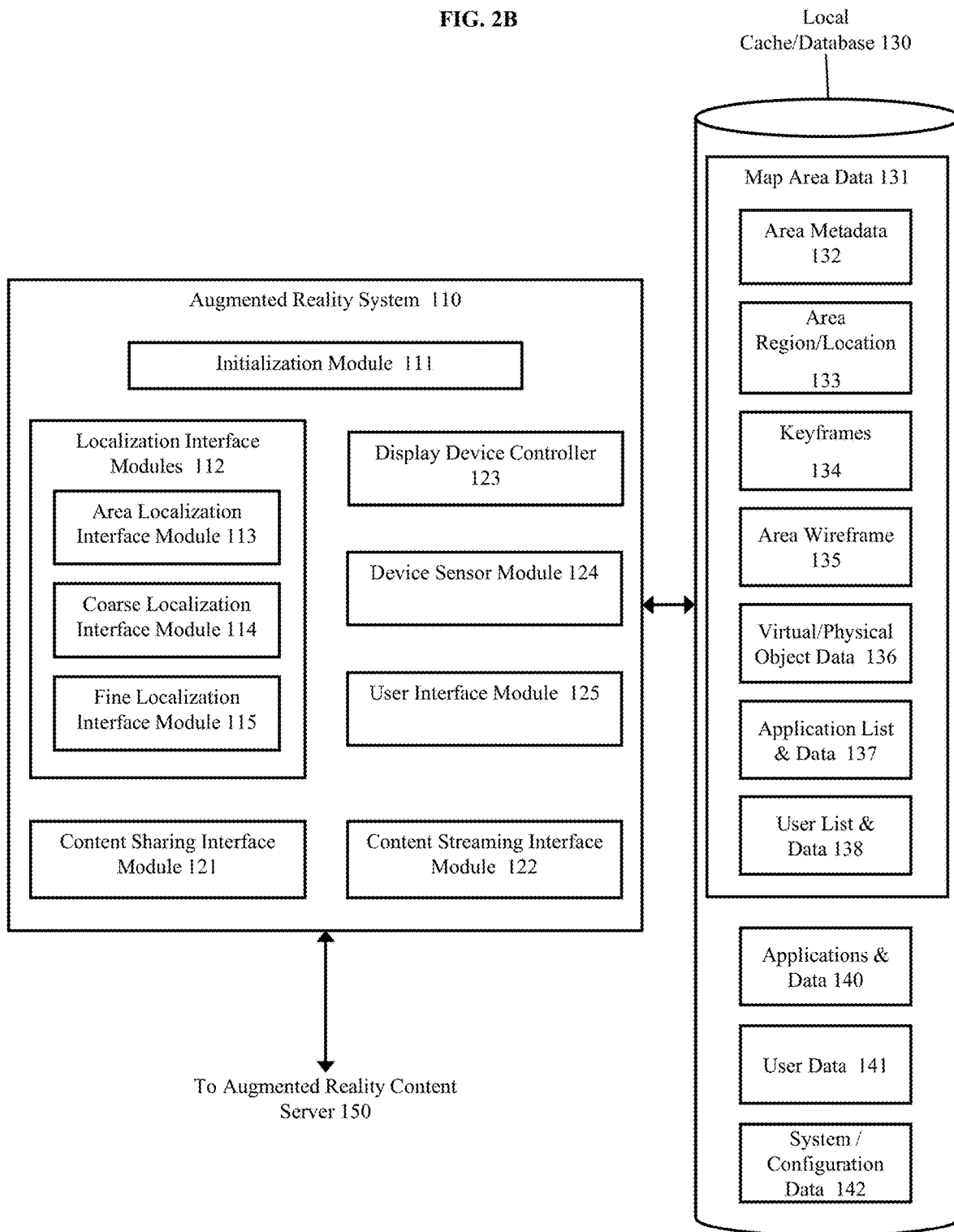

FIGS. 2A-B illustrate an example augmented reality content server and an augmented reality system, according to some embodiments. FIG. 2A provides an embodiment with a more detailed view of the server side infrastructure, while FIG. 2B provides an embodiment of a more detailed view of an augmented reality device.

FIG. 2A illustrates an example augmented reality content server 150 and server database 160. In addition to elements illustrated in FIG. 1, the augmented reality content server 150 and the server database 160 have been modified to illustrate data and modules for localization and content services.

Items with the same reference number are the same as describe in regard to FIG. 1 except to the extent that they are described differently here. Specifically, the augmented reality content server 150, the localization modules 151, the server database 160, the map area data 161, the area metadata 162, the area region/location 163, the keyframes 164, and the features 164*a* are described above in regard to FIG. 1. However, one difference can be found within the localization modules 151, which have now been populated with an area localization module 152, a coarse localization module 153, and a fine localization module 154.

The area localization module 152 may be used to select a match or best matching map area or region. The area localization module 152 may use metadata collected from a user device (e.g., the augmented reality display device 101), whether alone or in combination with coordinate information, to determine an area location. Such techniques will be discussed with regard to at least FIGS. 3-7J. However, briefly the technique comprises gathering relevant metadata accessible or identifiable at an augmented reality device (e.g., the augmented reality display device 101), such as by gathering information pertaining to wireless networks that can be sensed at the augmented reality device, and comparing the metadata received/gathered by the augmented reality device with the area metadata 162 of a plurality of map area data sets (e.g., the map area data 161). For example, the area localization module 152 may compare a set of received metadata to a plurality of sets of map area data each including or corresponding to a set of area metadata such as the map area data 161 to identify one or more map areas that matches or is the best match to the received/collected area metadata.

The coarse localization module 153 can be used to identify a best matching keyframe once a particular map area has been identified. As a general matter, map areas comprise an area region/location. For example, a user's home may comprise one area where the boundary of that area is the same as their property boundary (e.g. parcel) and the area region/location may also be associated with an area wireframe 165 that is representative of the various walls, doors windows, of the home along with other relevant objects or physical features. Within this location, some user devices may have previously provided keyframes to the augmented reality content server 150 which were previously stored as keyframes 164. The keyframes 164 themselves correspond to an image captured, usually a stereo image, at a known position and orientation. Features 164*a* associated with the keyframes 164 may be determined and stored. Examples of features include edges, corners, blobs, ridges, and the like. The keyframes 164 may be used as part of a process to perform coarse localization, by identifying a keyframe of the keyframes 164 associated with the identified area region that is the best match to an image taken at the augmented reality display device 101. The coarse localization may include capturing the keyframes 134, determining the features 134*a* in the keyframes 134 and comparing the features 134*a* in the keyframes 134 to the features 164*a* in the keyframes 164. In some embodiments, the necessary processing to determine the best matching keyframe could be performed on the augmented reality system 110 when the keyframes 164 are already present on the device (such as keyframes associated with map area data 131 stored in the local cache/database 130), or if the keyframes 164 are sent to the augmented reality system 110. However, in some embodiments the augmented reality content server may perform the processing of the keyframes 164.

The fine localization module 154 may be used as part of a process to determine the position and orientation of the augmented reality system 110 with respect to the map area origin. Generally, this may be completed in two steps. First, the relative position and orientation of the augmented reality system 110 may be determined relative to the matching keyframe. Second the position and orientation of the augmented reality system 110 may be determined by translating the relative position and orientation with respect to the matching keyframe to a position and orientation with respect to the map area origin. Furthermore, latency can be an issue when determining the pose of a user device because if the latency is too high the user may no longer be in the same or in a sufficiently similar pose. However, the processing capabilities of the augmented reality system 110 may be such that the latency in combination with the processing time at the augmented reality content server 150 is less than the processing time at the augmented reality system 110. Therefore, in some embodiments the fine localization may be executed at the augmented reality content server 150. Additionally, the execution may be predicated on a determination or other data indicating that the latency and processing time at the augmented reality content server 150 is less than the processing time at the augmented reality system 110.

At various times during and after the operation of the localization modules 151, the augmented reality content server 150 may utilize information gathered to initiate additional content services. Such actions could be taken in order to facility content streaming and content sharing.

For example, the area localization module 152 may be used to trigger relevant transmission of applications and associated data from applications & data 170. For instance, the area localization module 152 may determine that the identified area region/location includes a local fitness center. As a result, an application for the fitness center or an application associated with fitness activities may be transmitted to the user device (e.g., the augmented reality display device 101), such that the user can begin using the application either upon completion of the transfer or immediately upon the completion of the determination of the user's position and orientation, or some combination thereof. In one use case, a user may be able to use an application to setup a reservation on one or more exercise machines and start a training session with a virtual trainer. In order to facilitate such activities, a content streaming module 156 may be used to manage the selection of the application and streaming of data from the server database 160, for example system/configuration data 172 for the user device and user data 171 associated with a particular user (e.g. status as a current member at GOLD'S GYM and application preferences) may be used to trigger automatic transmission of data before the users' position and orientation are determined.

In another example, the area localization module 152 may be used to trigger relevant transmission of applications and associated data for content sharing. For instance, an application may be transmitted for facilitating a virtual group cycling class. Using the application, users may participate in a group class where each user is displayed virtual objects associated with other users in the class, such that real objects (e.g. other participants) are augmented with the virtual objects, and the virtual objects are provided by or populated with data from the individual users transmitted either directly or from within a local network (e.g. facility WiFi network) in order to avoid incurring delay. For instance, individual participants could select or be assigned virtual logos and numbers for teams that are virtually applied to their physical clothing as virtual objects viewable only by those using augmented reality devices (e.g., the augmented reality display device 101). In order to facilitate such activities, a content sharing module 155 may determine appropriate applications and data to provide from applications & data 170. Furthermore, a user list & data 168 for the map area data 161 may identify individual users present within the area, while virtual/physical object data 166 for that area may identify objects and their locations with respect to real world objects. Furthermore, in some embodiments the map area may be associated with an application list & associated data 167.

The area wireframe 165 may provide a virtual representation of physical objects (e.g. walls, windows, railings, stairs, etc.). Wireframe data can be particularly useful for determining which virtual objects to display. For instance, a user in a conference room giving a presentation would normally expect that the presentation would be viewable only by the users in the same room. Using the wireframe information, the content sharing module 155 can determine whether a user is in the same conference room and restrict or block access to at least the virtual portions of the presentation by users that are not in the same room.

FIG. 2B illustrates an example augmented reality system 110 and local cache/database 130. In addition to elements illustrated in FIG. 1 the augmented reality system 110 and the local cache/database 130 has been modified to include additional data and modules and for operating the augmented reality system 110.

Items with the same reference number are the same as describe in regard to FIGS. 1 and 2A except to the extent that they are described differently here. Specifically, initialization module 111, localization interface modules 112, area localization interface module 113, coarse localization module 114, and fine localization interface module 115 are as described previously.

Content sharing interface module 121 provides the augmented reality display device 101 side functionality for content sharing from the augmented reality system 110. For instance, the content sharing interface module 121 can be used to share virtual objects with other users that are generated by the user or the user's augmented reality display device 101. For instance, a user's augmented reality display device 101 may have stored therein a presentation such as in user data 141, which the user's augmented reality display device 101 may provide directly or over a local network to other users. In operation, this may be performed by first determining which users are in a designated area using user list & data 138 and/or the user list & data 168, and second by setting up a connection between the user sharing the content and the user receiving the content such that the shared content can be transmitted directly to the user or via a local network, but without sending the shared content through an external server. Furthermore, in some embodiments some or all of the content sharing may be facilitated or transmitted and processed using the augmented reality content server 150. However, content that is manipulated locally or that is time sensitive would generally be shared locally by transmission from the content provider to the content receivers either directly or over a local network to avoid any delay caused by the augmented reality content server 150.

Content streaming interface module 122 is similar to the content sharing interface module 121 except that the content streaming interface module 122 is provided to address content that does not originate from an augmented reality system 110. Content that originates elsewhere presents a different issue than that of content that originates from an augmented reality system 110. Specifically, content provided by the augmented reality display device 101 would generally suffer an unnatural delay if it had to be transmitted to augmented reality content server 150 and then retransmitted to devices that are local to the content owner such as during a shared viewing. However, content that originates from elsewhere would suffer an unnatural delay if it was first transmitted to a particular augmented reality system 110 before then being retransmitted by that augmented reality system 110 to other user devices. Therefore, for content that is streamed to two or more devices using the content streaming interface module 122, the augmented reality content server 150 could be used to send the content to the respective devices such that all users receive such content at the same time or the augmented reality content server 150 or content streaming interface module 122 could be used to synchronize the play back at the respective devices, e.g. by using time stamps and adjustable delays.

The local cache/database 130 largely mirrors that of the server database 160. However, the local cache/database 130 provides data management for the augmented reality system 110 and therefore may include some data not present in the server database 160. For example, the local cache/database 130 may include temporary data maintained for ongoing tracking and other data that mirrors a portion of the server database 160, e.g. local copies of map area data in use or frequently used, data associated with a favorite/bookmarked location, or map area data 131 for previously accessed map areas. However, most of the data in local cache/database 130 corresponds to the data or a subset thereof of data on the server database 160. For instance, area metadata 132 corresponds to the area metadata 162, area region/location 133 corresponds to the area region/location 163, keyframes 134 correspond to the keyframes 164, features 134a correspond to features 164a, area wireframe 135 corresponds to the area wireframe 165, virtual/physical object data 136 corresponds to the virtual/physical object data 166, application list & data 137 corresponds to the application list & data 167, user list & data 138 corresponds to the user list & data 168, applications & data 140 corresponds to the applications & data 170, user data 141 corresponds to the user data 171, and system/configuration data 142 corresponds to the system/configuration data 172.

Finally, the augmented reality system 110 may include a display device controller 123 for interfacing with the augmented reality display device 101, a device sensor module 124 for monitoring and managing the sensors and the data they collect, and a user interface module 125 for providing for a user to interface and control the augmented reality display device 101.

Figure 3:
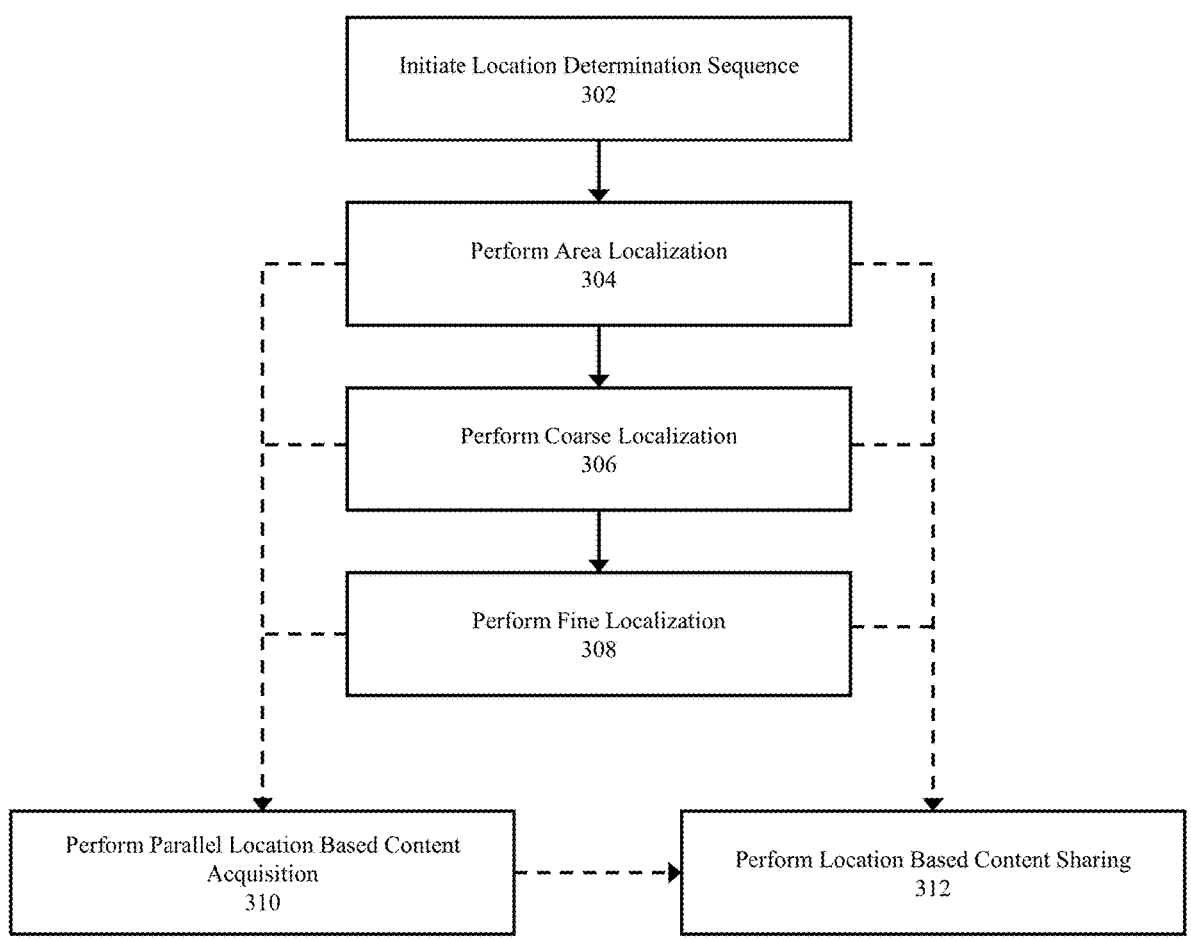
FIG. 3 illustrates an example process flow for performing a localization process, according to some embodiments.

FIG. 3 illustrates an example process flow for performing a localization process, according to some embodiments. Generally, the process operates by performing an identification of a map area, identification of a closest reference point, and determining a position and orientation using that reference point. Furthermore, during each phase in the process, certain steps may be taken to acquire content and to perform content sharing as appropriate.

The process starts at 302 where the location determination sequence is initiated. The initiation could be triggered by any number of things. For example, the location determination sequence may be triggered upon boot up, upon a determination that the augmented reality display device 101 does not know the map area that it is in, upon a determination that the augmented reality display device 101 does not know its position or orientation, upon the start of an application, upon initiation by a user, or any combination thereof.

At 304 area localization is performed to determine which map area the augmented reality display device 101 is in. This process will be discussed further in regard to FIGS. 4A-C. However, briefly area localization is performed by gathering relevant metadata identifiable at the augmented reality display device 101 location, which is in turn compared to previously stored metadata (e.g. at the server database 160) to identify the area that best matches the collected data.

At 306 coarse localization can be performed once the map area has been identified. Briefly, coarse localization is performed by first capturing a keyframe at the augmented reality display device 101 and identifying a keyframe (of a set of keyframes) associated with the map area that best matches the captured keyframe to be used in performing fine localization. The coarse localization process is described further in regard to FIG. 5.

Once the best matching keyframe has been identified, fine localization may be performed at 308. Fine localization can be performed using many techniques, for example determining the relative position of the user with respect to the best matching keyframe, and then translating the users relative position to the best matching keyframe into a relative position with respect to a shared map area origin in order to provide for consistent and sharable virtual object positioning, e.g. virtual objects positioned at the same location for each user and persisting across multiple augmented reality sessions. This process is described further in regard to FIG. 6.

Parallel location based content acquisition can be performed at 310. This process may be triggered at any number of stages. For instance, the area localization process may trigger the transfer of an application associated with a shopping mall when the area localization process determines that the user is in an area that corresponds to a map area of a mall, the coarse localization process may trigger the transfer of an application associated with a movie theater when an identified best matching keyframe is within a given distance from a movie theater ticket window, or the fine localization process may be used to trigger automatic transfer of a virtual menu application and ordering system for one or more nearby storefront.

Parallel location based content sharing can be performed at 312. This process is similar to that of the content acquisition, but for content transmitted from users in the area. For example, content sharing may be triggered at the level of an identified map area e.g. a street performer incorporating virtual objects in a public performance, content sharing may be triggered based on proximity to a best matching keyframe e.g. a movie theater transmitting virtual objects for a virtual quiz game to patrons waiting to enter the theater for a related movie, or based on an identified location e.g. the movie theater streaming special content to patrons that are identified to be within the movie theater itself and the content corresponding to the specific movie ticket held.

Figure 4A:
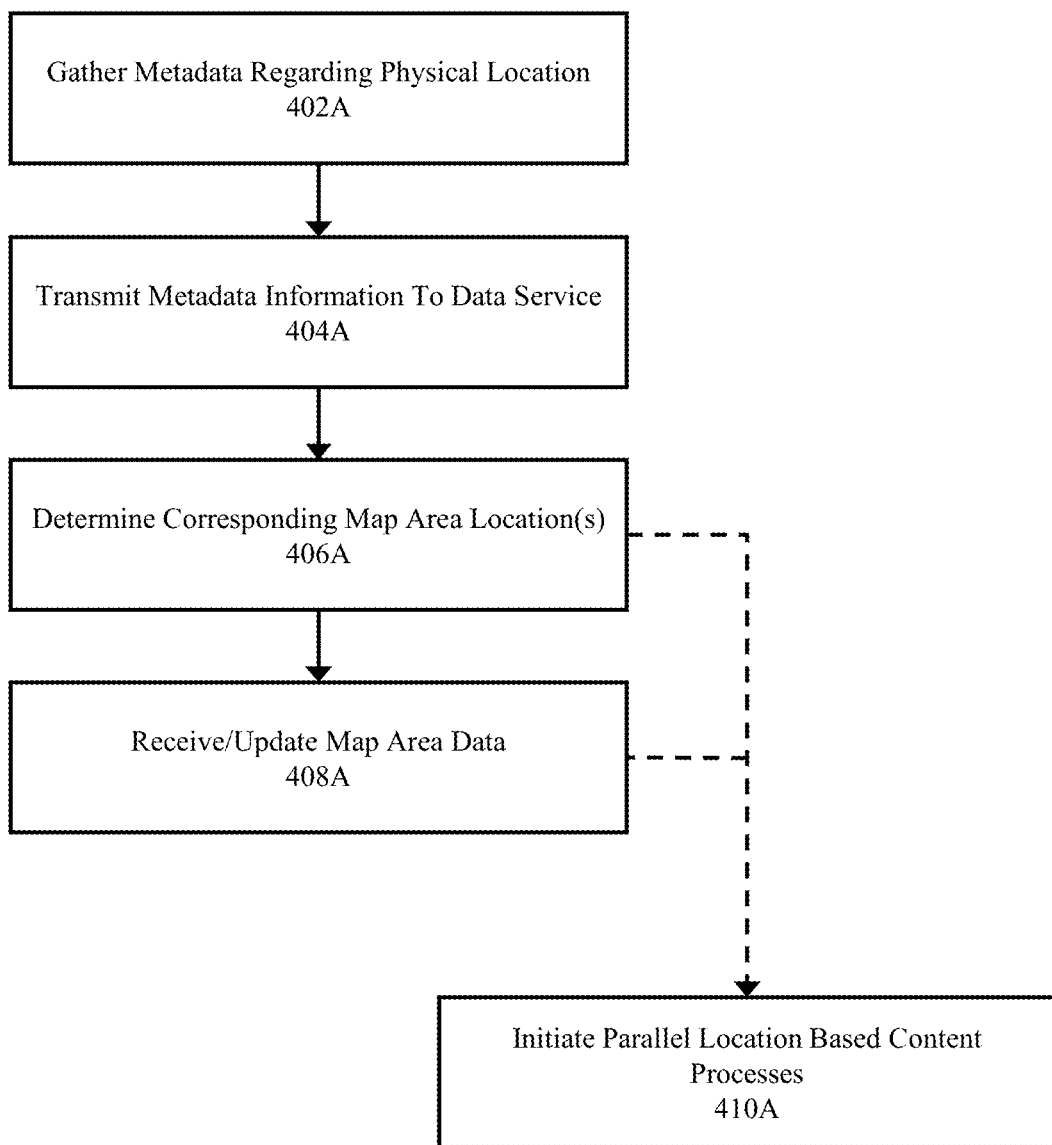
FIGS. 4A-C illustrate example process flows for the "perform area localization" step illustrated in FIG. 3, according to some embodiments.
Figure 4B:
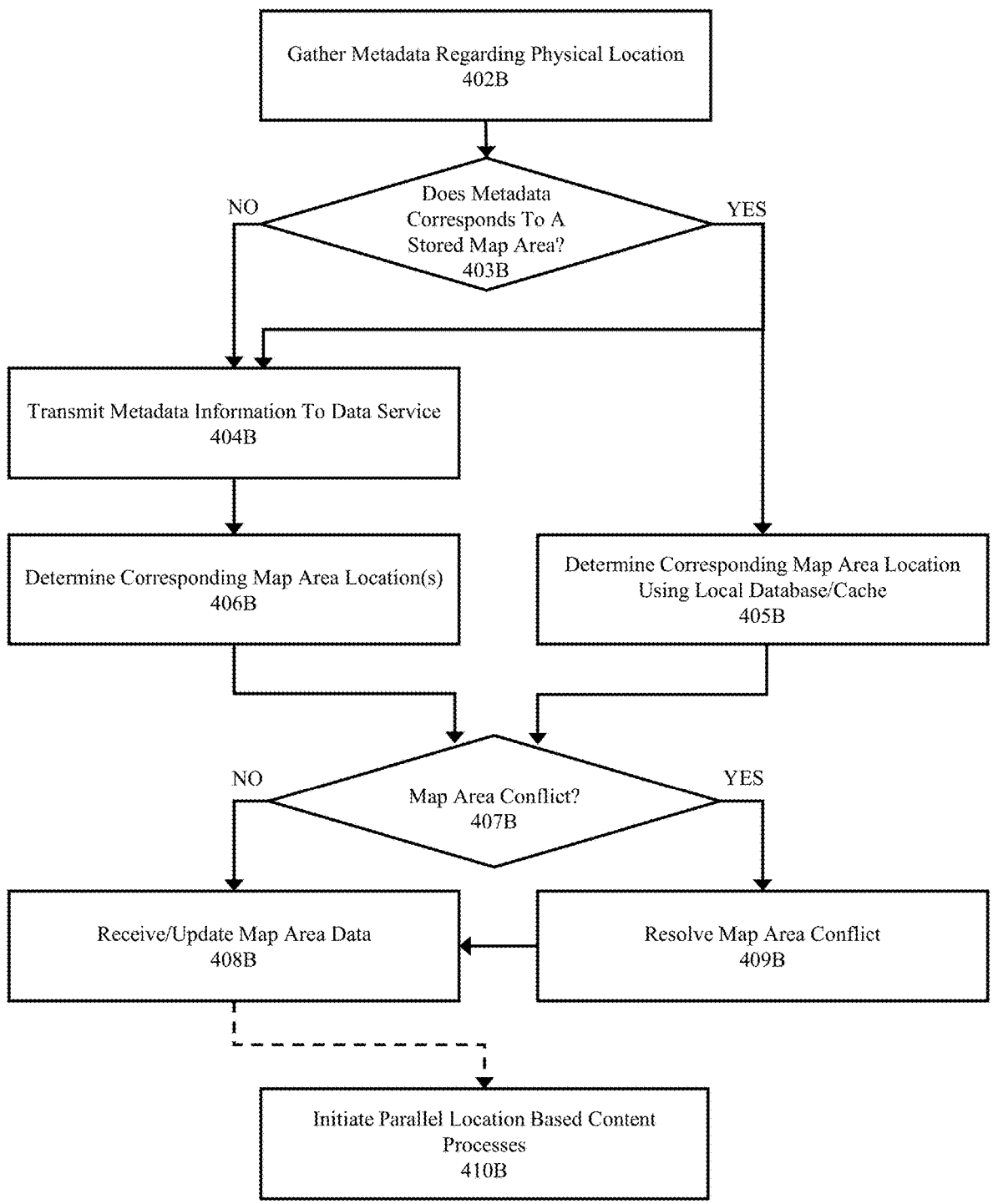
Figure 4C:
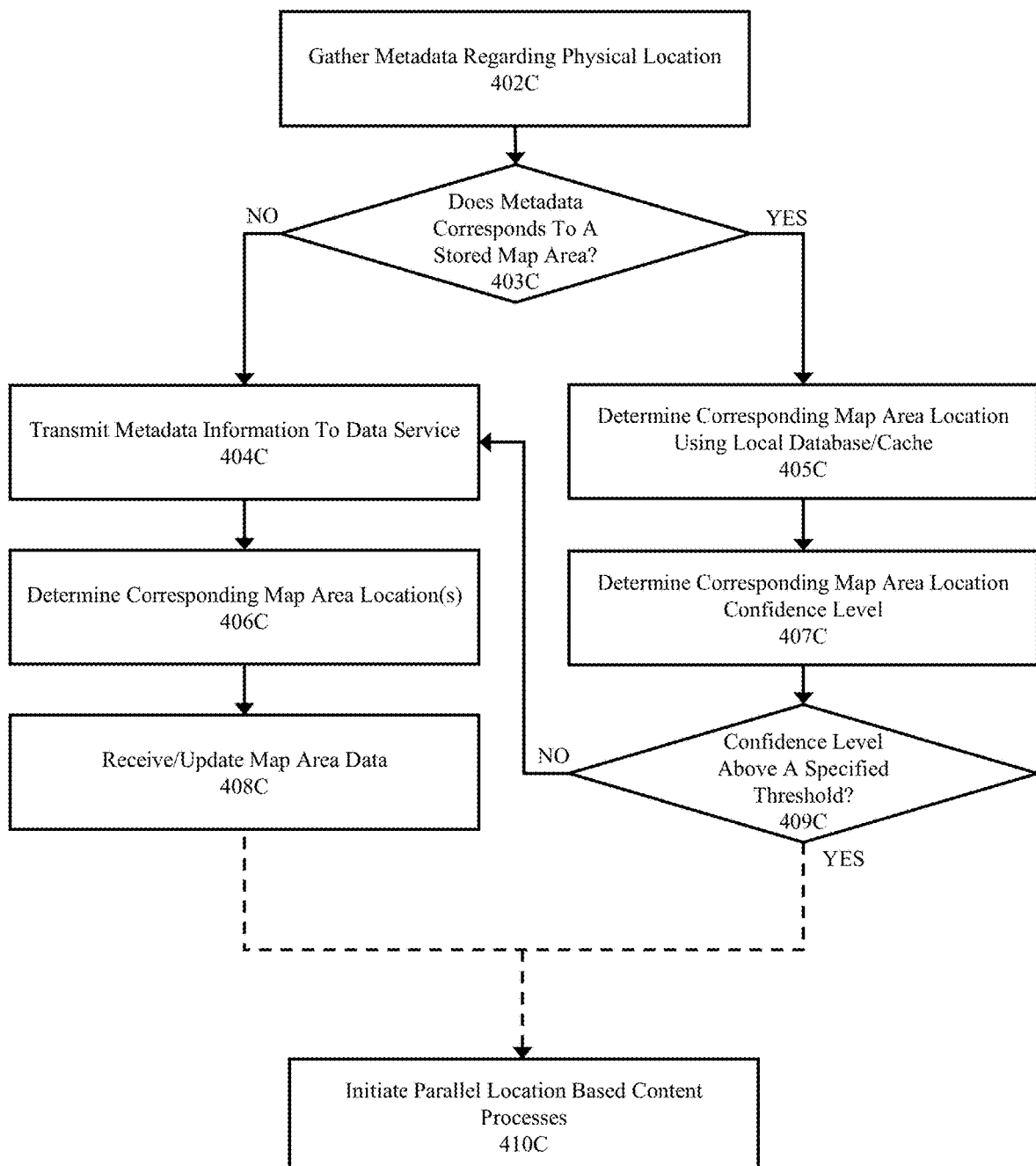

FIGS. 4A-C illustrate example process flows for the perform area localization step 304 illustrated in FIG. 3, according to some embodiments. FIGS. 4A-C each illustrate one possible flow of three possible process flows for determining the map area by performing processing at an augmented reality system, an augmented reality content server, or some combination thereof. Furthermore, while illustrated separately, aspects of each flow may be performed in any of the other process flows as appropriate.

FIG. 4A provides an illustration of an area localization process executed by gathering metadata and transmitting that metadata to an augmented reality content server for processing.

The process starts at 402A where metadata is gathered at a physical location of the augmented reality system. Metadata may include any relevant identifiable data e.g. any identifiable WiFi network information, Bluetooth devices, radio stations, broadcast television, cellular towers, or any other information transmitted via wireless protocols. In some embodiments, additional metadata may be gathered such as the temperature, position of the sun, moon, quick response codes (QR codes), street sign information, or any other data retrievable via image processing.

Once relevant metadata is gathered it can be transmitted to a data service or area localization module at the augmented reality content server at 404A. This information can then be stored in an associated database or in temporary memory for processing.

The collected metadata is used to determine a corresponding map area location at 406A. This can be performed using any techniques of matching data to identify map areas with corresponding metadata stored at the augmented reality content server (e.g. the area metadata 162) and to narrow those map areas to identify the map area that best matches the received metadata. For example, one set of metadata might include information corresponding to 10 WiFi networks, and in a first pass the map areas may be narrowed to include only map areas that are associated with at least one of the 10 WiFi network identified in the metadata, followed by further processing to determine the best matching map area using other or additional data. Furthermore, in some embodiments scores may be generated for each map area of a set of potential map areas that include at least some matching metadata, and the area with the highest score can be selected as the best matching map area.

In one embodiment, the metadata may be processed at 406A using heuristic methods and location information. For instance, GPS data could be collected from cellular devices and transmitted to the augmented reality system via peer-to-peer WiFi (such as APIPA or BONJOUR), broadcast universal datagram protocol, Bluetooth, or any other wireless device to device method. The GPS data or data associated with it can be analyzed to determine what level of accuracy the GPS data has (e.g. accurate to within 0.1 meters or to within 1.0 meter). The GPS data can then be combined with data representing the distance between the cellular device and the augmented reality system, e.g. within 1 to 5 meters of the cellular device. Using this type of processing, the location of the augmented reality display device can be found to within a region (e.g. between an inner and outer boundary). For example, assuming that the cellular device is at most 5 meters from the augmented reality system and that the level of accuracy of the GPS data is within 1 meter, then we know that the augmented reality display device is within a 6-meter region surrounding the cellular device. This 6-meter region may be sufficiently accurate to identify the augmented reality display device as being within a specific map area but will be dependent on various factors, e.g. the map areas size and the location of the GPS coordinates being far enough away from a map area boundary. Additional GPS information can be used from other cellular devices in order help narrow down a range that the augmented reality device is located within, where the additional GPS information can be used to generate additional regions that the augmented reality display device may be located in, and where the augmented reality system is within the area of regions where all the regions overlap. Furthermore, other devices could be associated with GPS coordinates. For example, WiFi hotspots could be mapped to specific areas and coordinates, e.g. a hotspot at a STARBUCKS could be presumed to be located within a structure that houses that particular STARBUCKS at some set of coordinates determined using map data. Additionally, the GPS information for a device might first comprise location data that is captured quickly but that is not particularly accurate, e.g. coarse position information accurate to within 1 meter. However, the GPS data may be updated by a cellular device with more accurate location information, e.g. fine position information accurate to within 0.1 meters. Thus, GPS position information for cellular devices may not be sufficiently accurate initially to identify the corresponding map area but may become so over time. Furthermore, the GPS information may be provided by any GPS enabled device that includes system/components for peer-to-peer transmission of the data between that device and the augmented reality system. In some embodiments, the heuristic method could be combined with the metadata matching techniques describe above, such as for preprocessing data in order to narrow the potential map areas or to select between map areas with otherwise similar data.

In some embodiments, the distance between the augmented reality display device may be predetermined, such as based on a communications protocol. For example, different maximum distances could be associated with different versions of the Bluetooth communications protocol, and those protocols could also be associated with a default minimum distance (e.g. zero meters). In some embodiments, the minimum and maximum distances could be determined based on signal strength information. For example, WiFi communications protocols are commonly associated with differing signal strengths for transmission, and different characteristics for absorption by materials in the environment. Therefore, using information collected at the augmented reality system, computations can be performed to estimate the distance from the transmitting device. Such information could be analyzed using default or simple models that are always applied in the same way regardless of environment characteristics. However, in some embodiments, the calculations could take into account things like emissivity of walls, ambient air temperature, humidity, and the like. In this way, the augmented reality system can estimate the minimum distance and the maximum distance the augmented reality system is from a transmitting device based on at least the signal strength.

Once the best matching map area is identified, the augmented reality content server can transmit new/updated map area data to the users augmented reality system at 408A including any data corresponding to the area metadata 132, the area region/location 133, the keyframes 134, the area wireframe 135, the virtual/physical object data 136, and the user list & data 138. Furthermore, various thresholds or conditions can be implemented for use in updating map area metadata such that metadata for any given map area is not updated solely as a result of a single occurrence of a particular piece of metadata, but as a result of some number of occurrences possibly over a minimum amount of time and/or from a minimum number of users or devices.

Finally, the process at 406A and/or 408A may trigger the initiation of parallel location based content processes 410A for the identified map area as discussed above in regard to content acquisition 310 and content sharing 312.

FIG. 4B provides an illustration of an area localization process executed by gathering metadata and transmitting that metadata to an augmented reality content server for processing while also processing the same metadata at the augmented reality system.

The process starts at 402B where metadata is gathered at a physical location of the augmented reality system as discussed above in regard to 402A. However, in contrast to the process illustrated in FIG. 4A, the present illustration includes a determination at 403B as to whether the collected metadata includes metadata that corresponds to a map area that is stored at the augmented reality system 110, e.g. a map area stored in the local cache/database 130 at area metadata 132. If the metadata corresponds to locally stored metadata then the process proceeds with a local determination of the map area at 405B and a remote determination of the map area at 404B and 406B. Otherwise the process proceeds only with a remote determination of the map area, e.g. at augmented reality content server 150.

Transmitting metadata information to a data service at 404B is essentially the same as that discussed above with regard to 404A. Likewise, determining corresponding map area location(s) at 406B is essentially equivalent to that discussed in 406A. Finally, determining a corresponding map area location using local database/cache at 405B is also essentially the same as 406A except to the extent that 405B operates using a local dataset instead of the dataset stored at the augmented reality content server 150.

At 407B the process determines whether there is a map area conflict, e.g. the map area identified at the augmented reality display device is not the same as the map area identified at the remote server. This could be performed at the augmented reality display device, augmented reality system 110, or at the remote device, augmented reality content server 150. This can be performed using any number of techniques, e.g. comparing map area IDs, comparing map area regions/boundaries, comparing map area origins, comparing some or all map area data, or any combination thereof. Furthermore, in the event that it was determined at 403B that there was no corresponding stored map area at the augmented reality display device then the process may skip the determination at 407B and proceed directly to 408B where the augmented reality display device receives new or updated map area data as describe in regard to 408A.

In the event that the determination at 407B includes a map area conflict, then process proceeds to 409B where the conflict is resolved. This is essentially a limited form of the process described above in regard to 406A where the map area identified at the augmented reality display device and the map area identified at the remote system are both evaluated to determine which is the better match. This can be performed at either the local or the remote device. However, the present illustration presumes that this will occur at the remote device because the remote device includes the full set of map data, whereas the augmented reality display device includes a limited set of map data that may not be as up to date as that on the remote device. Regardless, the process could be performed at the augmented reality display device provided that the augmented reality device includes or is provided the appropriate data to be able to perform a reliable determination.

Finally, the process may initiate at 410B parallel location based content processes similar to those discussed above regarding 410A.

FIG. 4C provides an illustration of an area localization process executed by first processing gathered metadata at the augmented reality system when the metadata corresponds to a stored map area and subsequently processing the metadata at the augmented reality content server when the identified map area is below a given threshold level of confidence.

As with the illustration in FIG. 4B, the present figure includes a number of steps that correspond to those of FIGS. 4A and 4B. Specifically, 402C corresponds to 402A, 404C corresponds to 404A, 406C corresponds to 406A, 408C corresponds to 408A, and 410C corresponds to 410A. Furthermore, 403C is similar to 403B except to the extent that when the augmented reality display device includes one or more map areas associated with metadata that matches at least some of the metadata gathered at the augmented reality display device, only a local determination is made as to which map area is the best match. A score is then calculated to determine if that match is deemed to have a sufficient level of confidence. When there is no matching stored metadata or when the confidence level is below a specified threshold, the process proceeds at 404C.

When there is matching metadata at the augmented reality display device as determined at 403C, the process continues at 405C by determining a corresponding map area using the local database/cache 130 as discussed in 405B. Subsequently a confidence level is calculated for the map area at 407C. The confidence level may be calculated using any appropriate techniques, e.g. determining an amount of metadata associated with the map area that is a match to the corresponding map area, computing the amount of metadata that does not have a corresponding match, implementing weights for different types of data, or any combination thereof.

Finally, if it is determined at 409C that the calculated confidence level is above the given threshold, then the process may proceed to 410C, otherwise the process proceeds through 404C, 406C, and 408C at the augmented reality content server to determine the best matching map area.

While the forgoing has illustrated weights and confidence thresholds separately, weights and confidence thresholds, as well as any other techniques, may be used to determine the best matching map areas. Furthermore, the disclosed techniques may be used to enforce minimum confidence thresholds such as for a determination as to whether a best matching map area has sufficient similarity to be used as a matching map area. For instance, if no map area is found that includes any matching metadata or if only a small portion of metadata is found but that metadata matches multiple map areas, the location may be found to have insufficient information with which to identify any particular map area as a matching map area.

Figure 5:
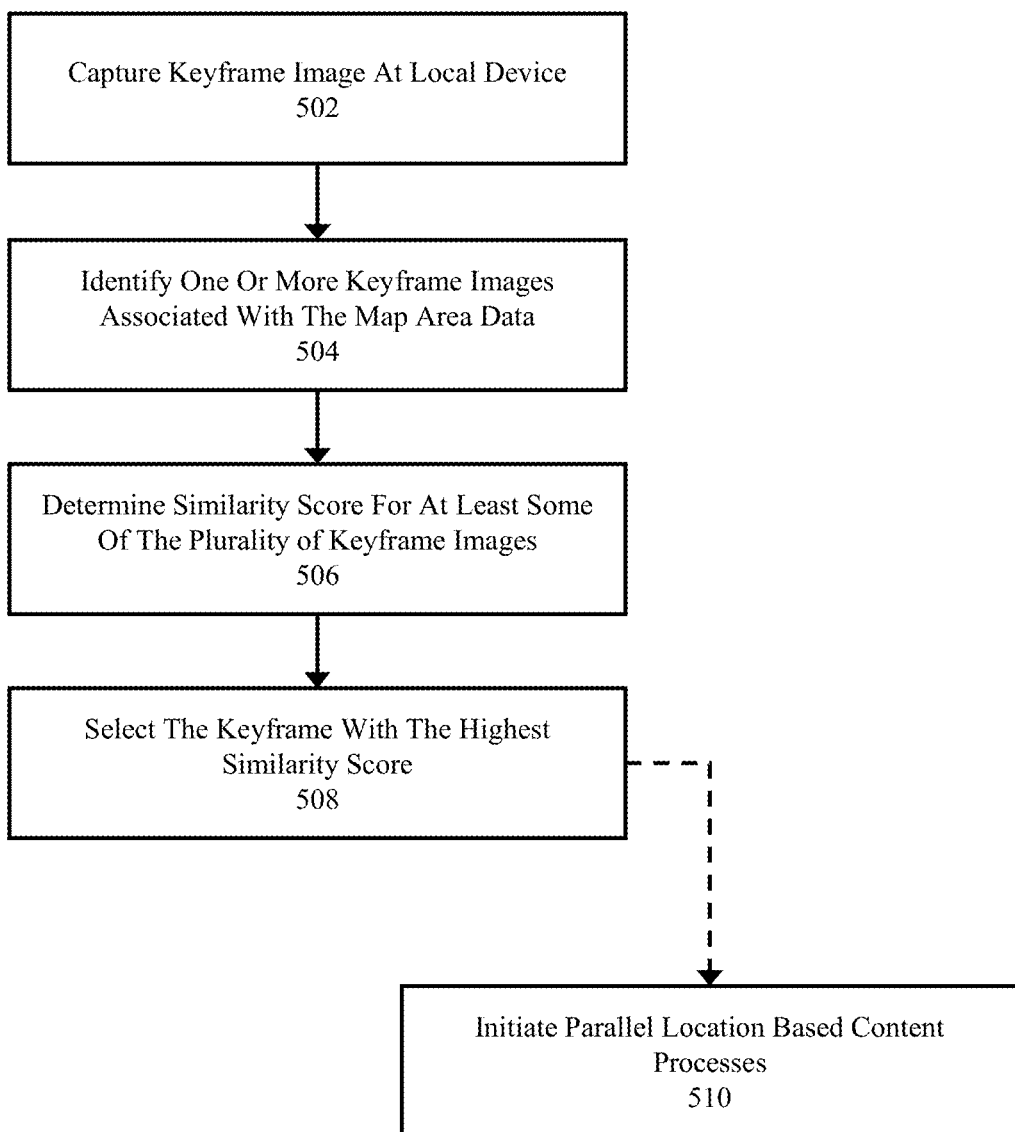
FIG. 5 illustrates an example process flow for the "perform coarse localization" step illustrated in FIG. 3, according to some embodiments.

FIG. 5 illustrates an example process flow for the "perform coarse localization" step illustrated in FIG. 3, according to some embodiments. This process generally includes capturing a keyframe at a local device (e.g., the augmented reality display device) and comparing that keyframe to a set of previously captured keyframes to determine the nearest or best matching keyframe. As illustrated, the process is executed on the augmented reality content server. However, there is no such restriction here as the local device (augmented reality system 110) may also be used to process keyframes. The sole difference between the two being that processing the keyframes at the local device may necessitate transfer of the one or more keyframes to the local device, such as when additional keyframes are available or the keyframe data is out of date.

The process starts at 502 where a keyframe is captured at the local device. For example, a keyframe may be captured using an apparatus attached to or integrated in the augmented reality display device and controlled using a device sensor module 124. The apparatus could include a single camera, dual cameras for stereo vision, a 360-degree camera, or some combination thereof. Furthermore, because the apparatus is attached to or integrated in the augmented reality display device, the captured image(s) have a known/fixed position relative to that of the users.

At 504 one or more keyframes associated with the previously identified map area are identified. The keyframes may be stored as part of a map area data set such as illustrated in map area data 131 and 161 which include keyframes 134 and 164, respectively, and the features 134a and 164a, respectively. However, the present disclosure is not limited to such. The keyframes and features may be stored in any manner, such as via a keyframe/features database where individual keyframes and associated features are identified with one or more identifiers, e.g. based on a map area ID, a unique identification key generated based on any data, based on the position/location information associated with those keyframes, or any combination thereof. The features 134a and 164a in the keyframes 134 and 164, respectively, may be determined.

At 506 the keyframe captured at the local device is compared to the one or more keyframes identified at 504 to generate a similarity score for each keyframe. This process may be performed using any appropriate technique. In some embodiments, the features 134a in the keyframes 134 are compared to the features 164a of the keyframes 164. In these embodiments, the similarity score for the keyframe 134 is based on the features 134a and the features 164a.

Finally, at 508 the keyframe with the best similarity score is selected, which may be used to trigger parallel location based content processes 510 for the identified keyframe as discussed above in regard to content acquisition 310 and content sharing 312.

Figure 6:
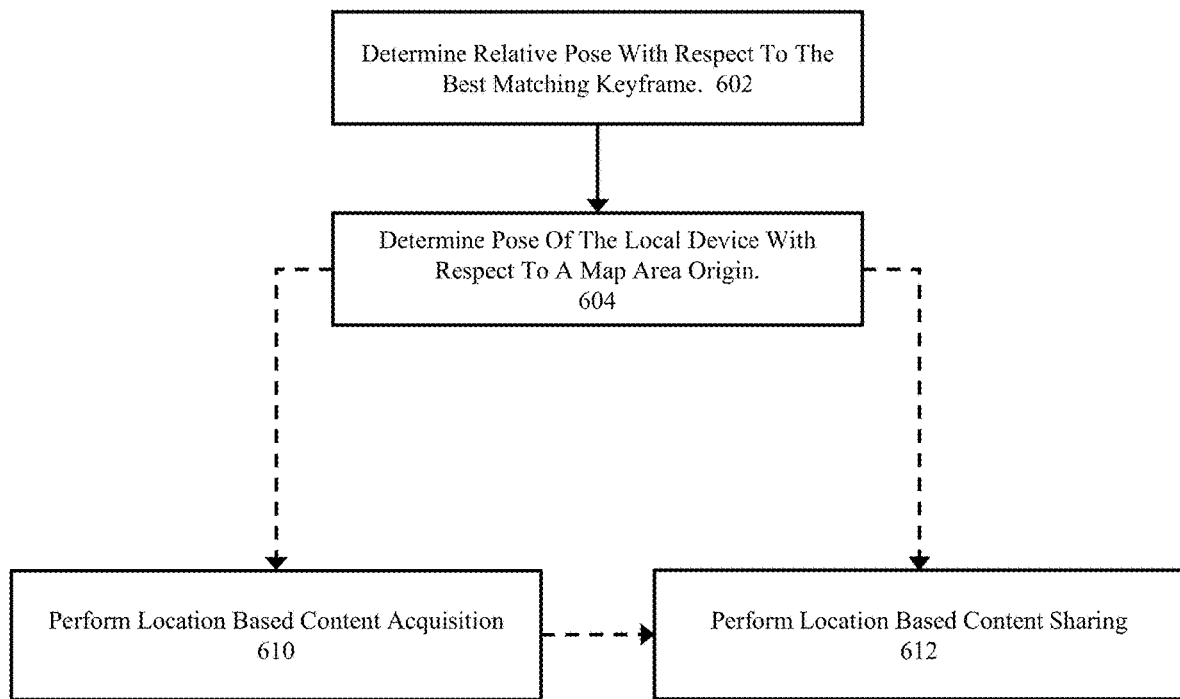
FIG. 6 illustrates an example process flow for the "perform fine localization" step illustrated in FIG. 3, according to some embodiments.

FIG. 6 illustrates an example process flow for the "perform fine localization" step illustrated in FIG. 3, according to some embodiments.

At 602 the captured keyframe is compared to the best matching keyframe. This process may be performed using any appropriate technique in order to determine the devices pose with respect to the best matching keyframe.

Finally, at 604 the pose of the local device can be determined using the position of the best matching keyframe with respect to the map area origin and the relative position of the local device with respect to that keyframe. The position of the augmented reality device with respect to the map area origin may be determined using the relative pose with respect to the keyframe and the keyframes pose with respect to the map area origin. This can be accomplished by chaining two transforms: one from the map area origin to the keyframe and one from the keyframe to the local device. Thus, the pose of the local device can be determined with respect to the map area origin. Therefore, to determine the map area origin of the local device (e.g., augmented reality display device 101), the relative position with respect to a keyframe can be translated to a relative position with respect to the map area origin.

Once the position of the local device with respect to the map area origin is determined, location based services that depend on a known position can be initiated. For instance, at 610 location based content acquisition can be performed based on the local device position and orientation, e.g. pulling reservation schedule data and a reservation application from the augmented reality content server 150 for one or more restaurants in view. In another example of location based services, at 612 location based content sharing may be initiated based on a determination that another user in the area is sharing content, e.g. joining a meeting that includes virtual objects as part of a discussion or presentation.

FIGS. 7A-J provide an illustrative example of a localization process for a user at an undetermined location, according to some embodiments. In some embodiments, the augmented reality display device may presume that the current location is the last known location in order to facilitate retrieval of potentially relevant data or display virtual objects previously within view or within an accessible region of the augmented reality display device. In order to enable shared experiences with other users who are also using an augmented reality system, the location and specific positioning information must be either confirmed or determined. Regardless, the present example presumes no default position/location information.

Figure 7A:
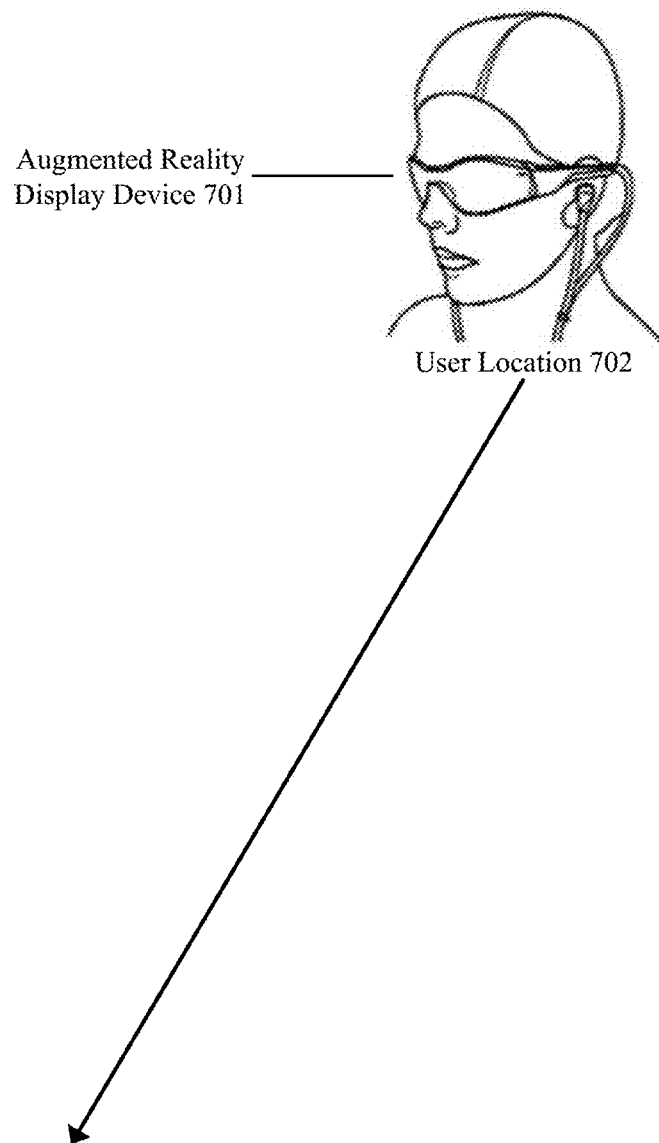
FIGS. 7A-J provide an illustrative example of a localization process for a user at an undetermined location, according to some embodiments.

FIG. 7A illustrates an augmented reality display device 701 (e.g., the augmented reality display device 101) worn by a user at a user location 702 that is undetermined/unidentified by the augmented reality system 110. A location may be undetermined/unidentified due to any number of reasons, e.g. the augmented reality display device 701 was just booted/rebooted, sensor data has become corrupted, wireless signals may have been lost, etc. Thus, triggering the need for the augmented reality display device 701 to perform localization.

Figure 7B:
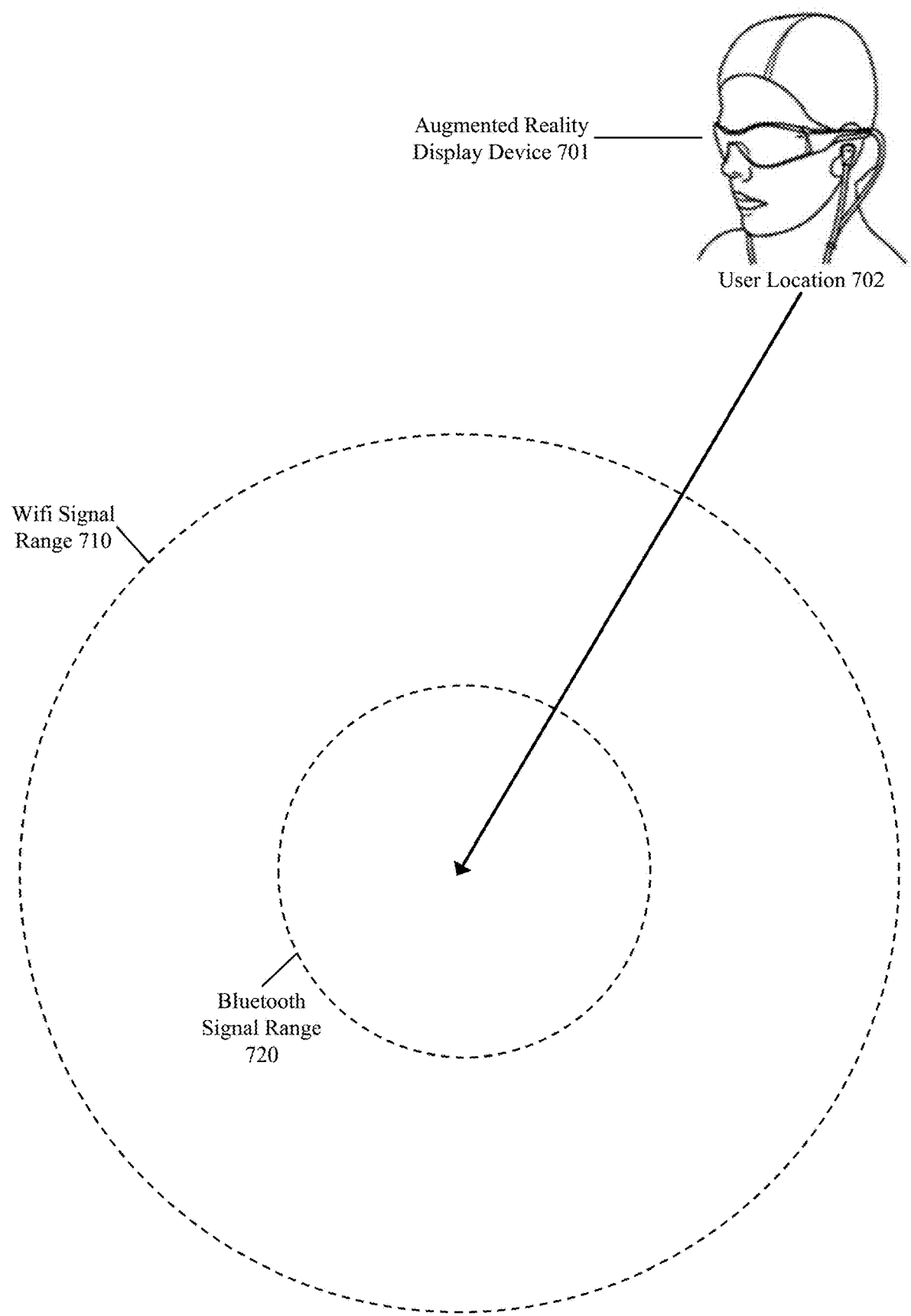

FIG. 7B illustrates relative ranges of two different communication protocols with respect to the user location 702. A first range which is the shorter of the two is the Bluetooth signal range 720. A second range which is the longer of the two is the WiFi signal range 710.

Figure 7C:
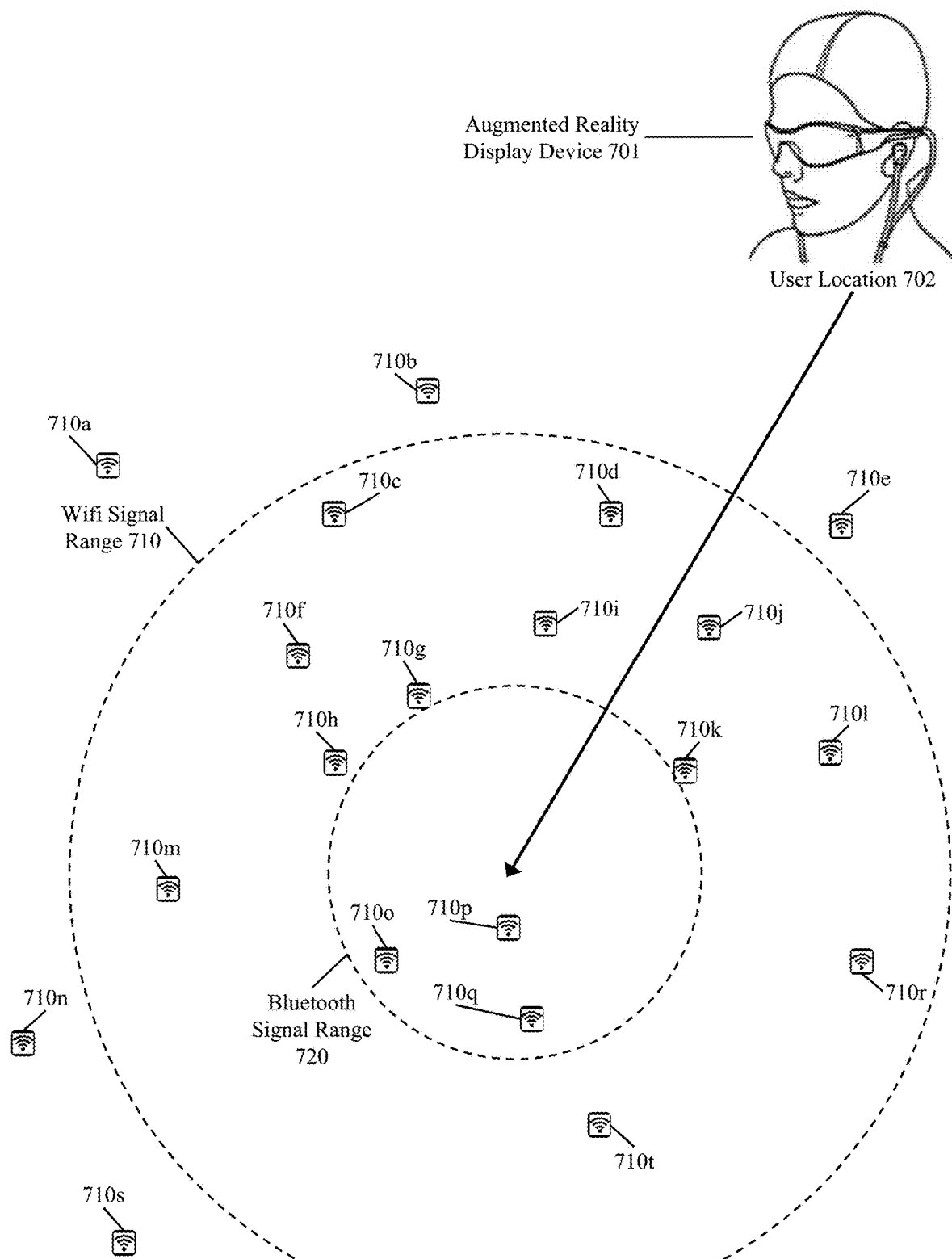

FIG. 7C illustrates the addition of various WiFi networks that may or may not be identifiable by the augmented reality display device 701. As illustrated, the WiFi signals within the WiFi signal range 710 (here 710c-d, 710f-m, 710o-r, and 710t) may be detected by the by the augmented reality display device 701, while 710a-b, 710e, 710n and 710s are too distant from the augmented reality display device 701 to be detected. As such the augmented reality display device 701 may collect metadata corresponding to these WiFi networks for use in determining the correct map area location.

Figure 7D:
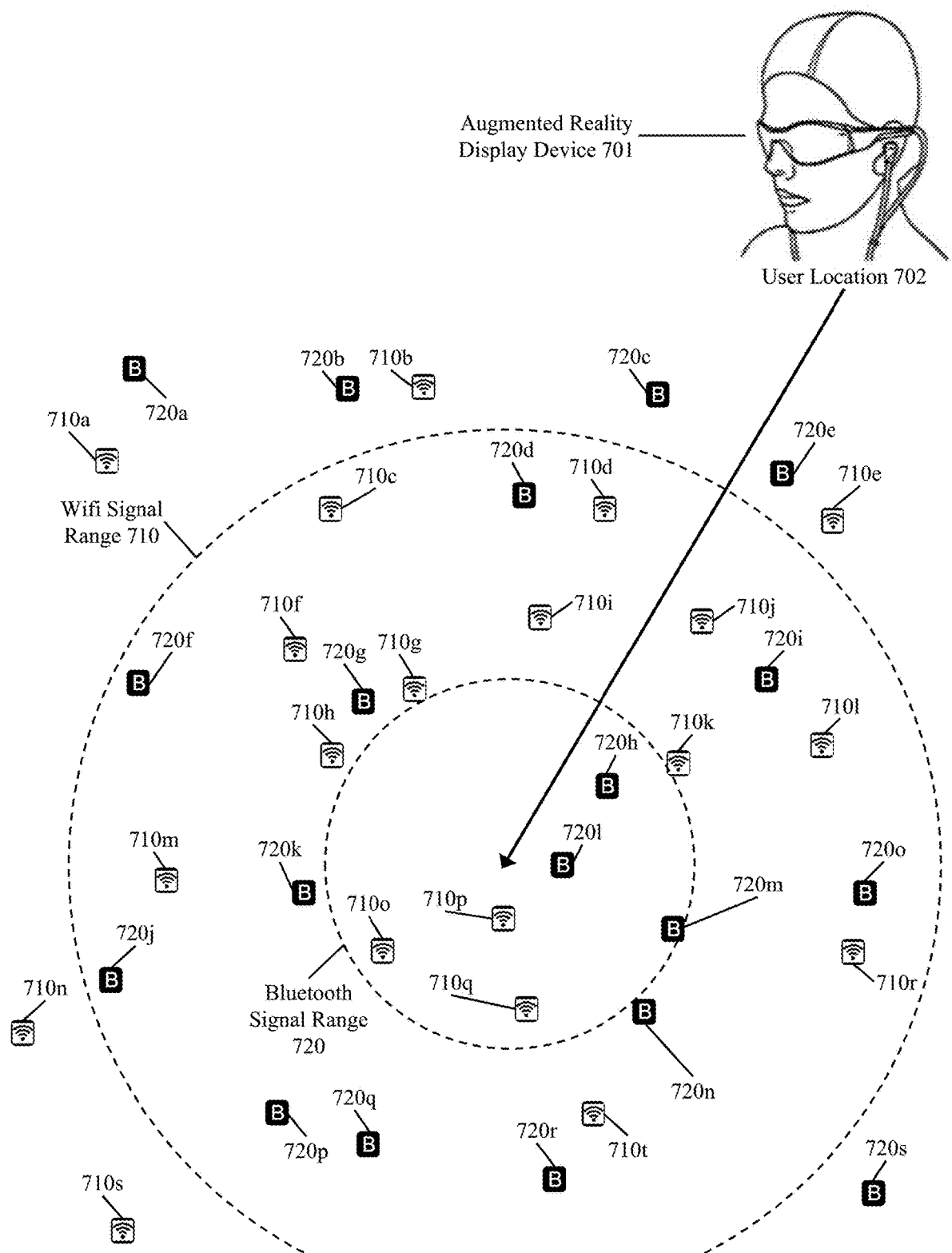

FIG. 7D illustrates the addition of various Bluetooth networks proximately located with respect to the user location 702. Similar to the WiFi networked discussed previously, metadata may be gathered pertaining to the network/devices within the range of detection 720. Here this includes 720h, 720l, and 720m, while 720a-g, 720i-k, and 720n-s are undetectable.

Figure 7E:
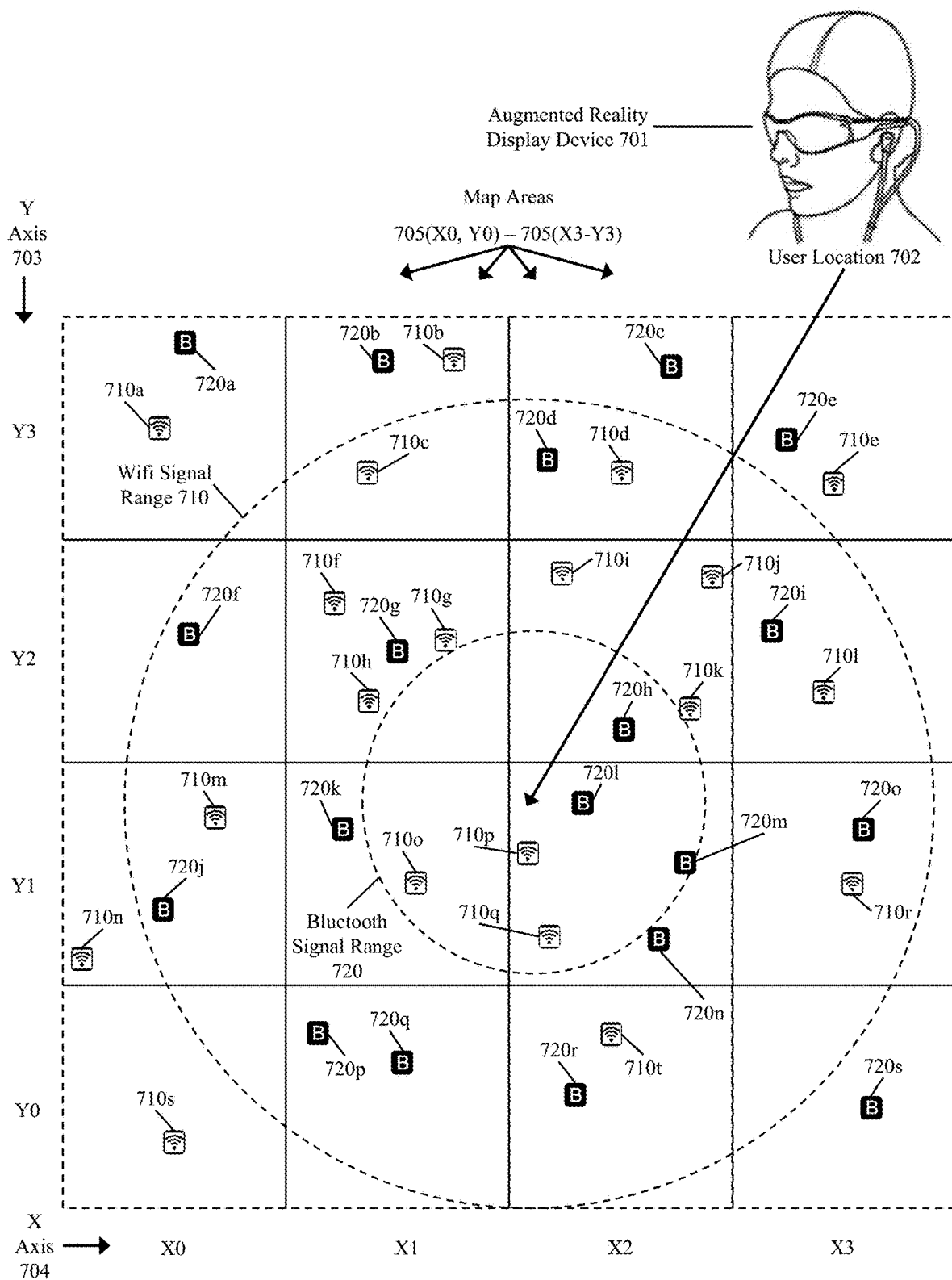

FIG. 7E illustrates an overlay of a set of map areas. The map areas 705(X0, Y0)-705(X3, Y3) are illustrated as a set of square regions identified here by their positions on an X axis 704 and Y axis 703. These map areas may be identified by matching the metadata collected to metadata previously stored in a location associated with the respective map areas, e.g. map areas that are known to be associated with one or more identified WiFi networks and Bluetooth devices. However, the regions may have any shape and may be identified in any way as discussed previously and are merely shown in this way for ease of illustration. Furthermore, the location of the augmented reality display device 701 with respect to the map areas would not be known by an augmented reality system (e.g., the augmented reality system 110) or an augment reality content server (e.g., the augmented reality content server 150) during this part of the process, however for the sake of continuity, the user location and the map areas are shown in their actual positions.

Figure 7F:
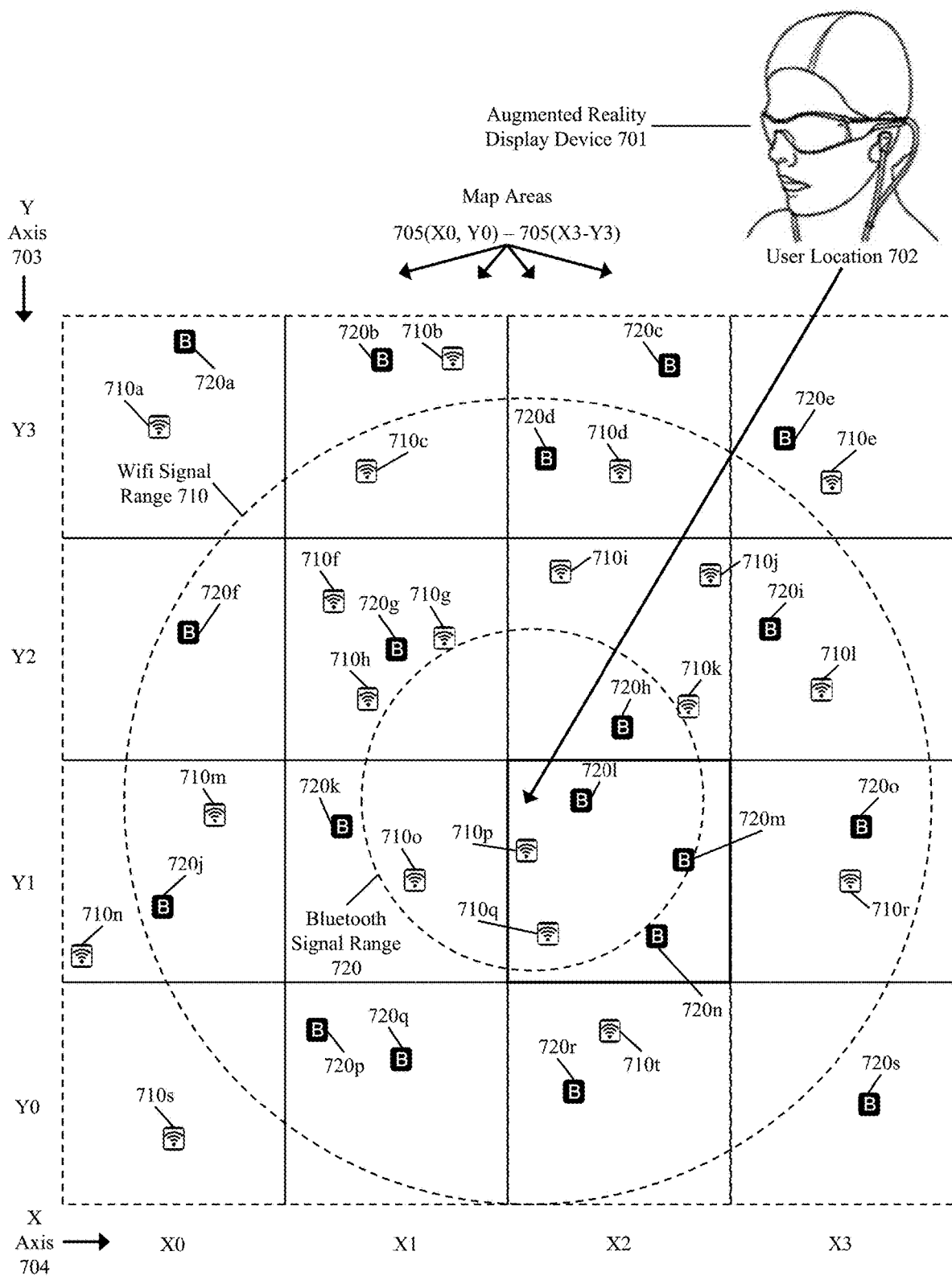

FIG. 7F illustrates the determination of the map area that is the best matching map area. This can be performed as discussed above, where the metadata collected at the augmented reality system may be compared to previously stored metadata collected at known locations to identify a best matching map area. For instance, the map area that includes the most matching metadata to the metadata collected can be selected as the map area that the device is in. Here, the map area 705(X2, Y1) has been identified as the best matching map area.

Figure 7G:
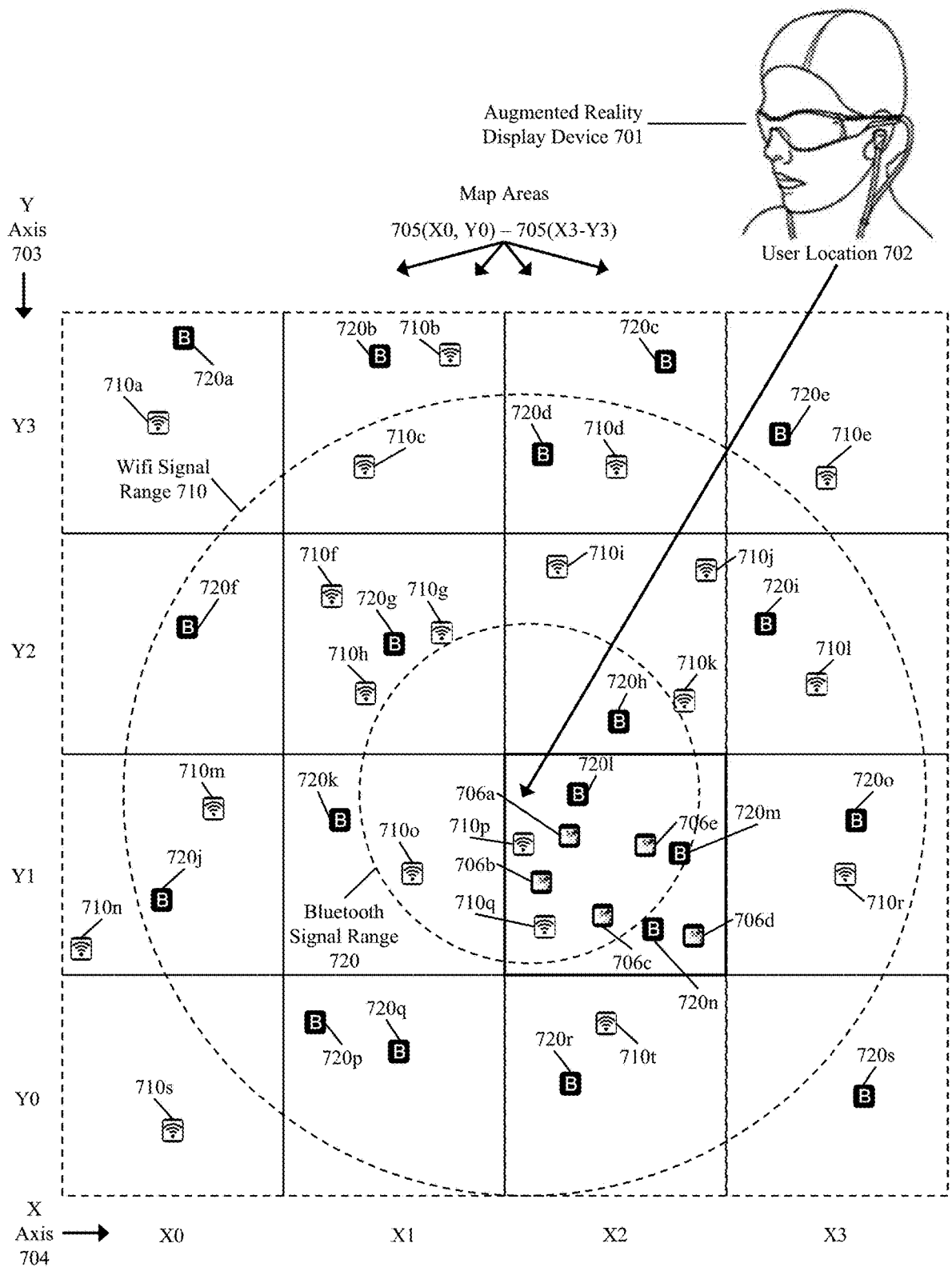

FIG. 7G illustrates a set of keyframes take at known locations from within the best matching map area. The keyframes 706a-e may be dispersed randomly across the map area 705(X2, Y1) as illustrated here. However, other techniques may be used to collect keyframes such as triggering the capture of a keyframe whenever a user is in or near a desired location for capture or through a setup process. The keyframes themselves are processed as previously discussed to determine a best matching or closest keyframe.

Figure 7H:
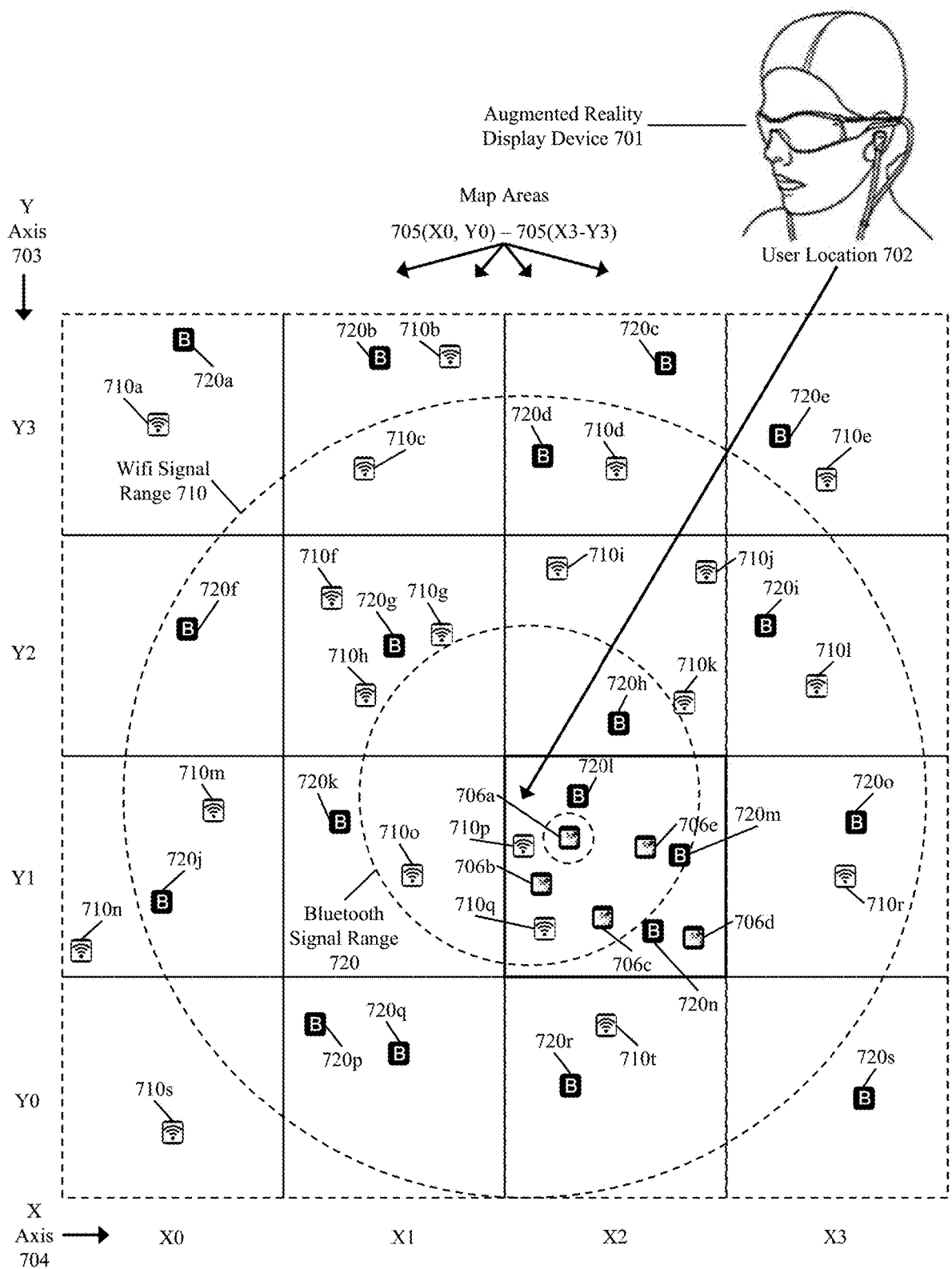
Figure 7I:
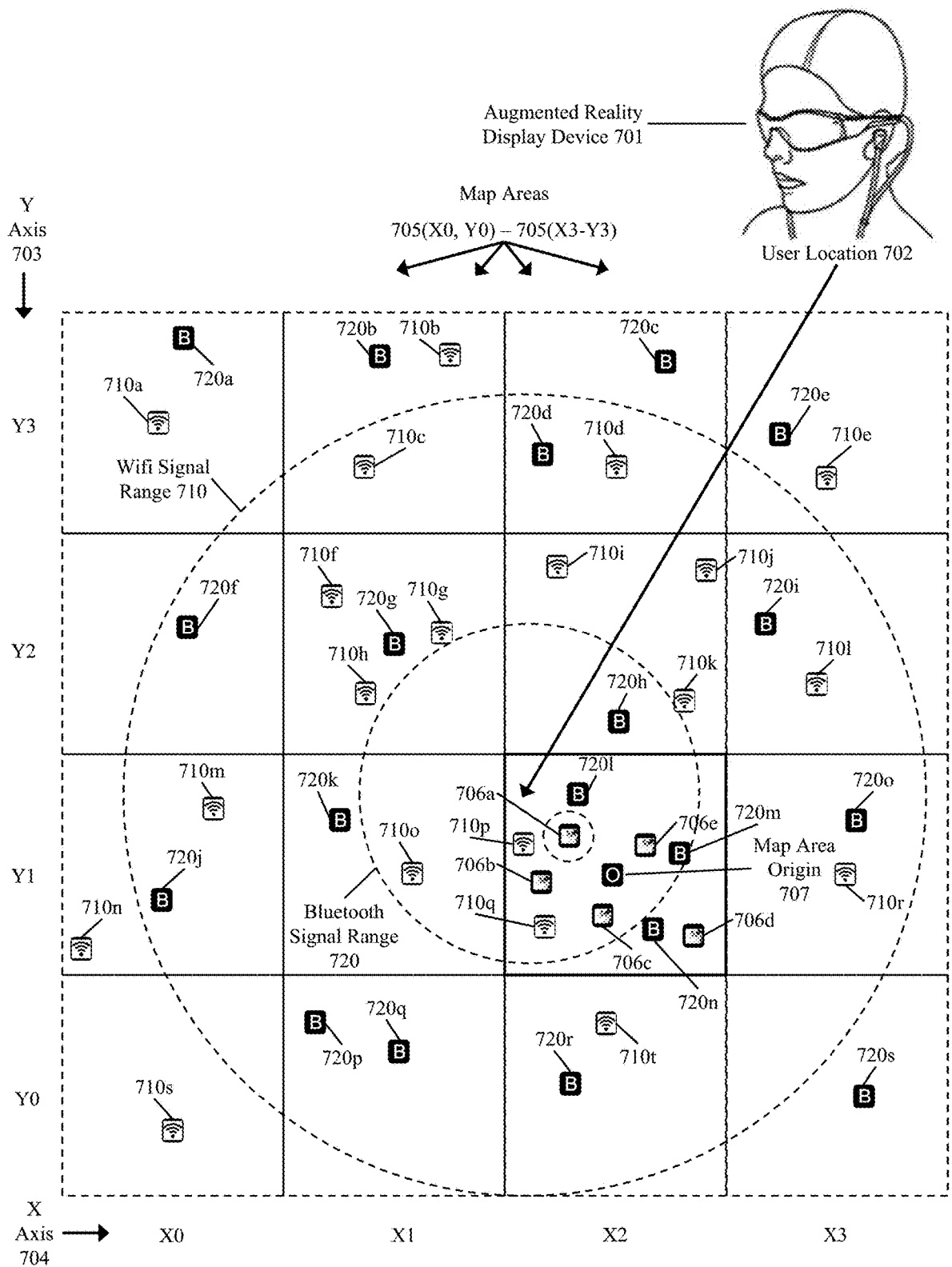

FIG. 7H illustrates the selection of the best matching keyframe with respect to the captured keyframe. Specifically, keyframe 706a is determined to be the most similar to the keyframe captured at the user device. Subsequently, the relative position of the augmented reality display device 701 may be determined with respect to the keyframe, and finally the relative position of the augmented reality display device 701 can be translated with respect to a map area origin 707 illustrated in FIG. 7I.

Figure 7J:
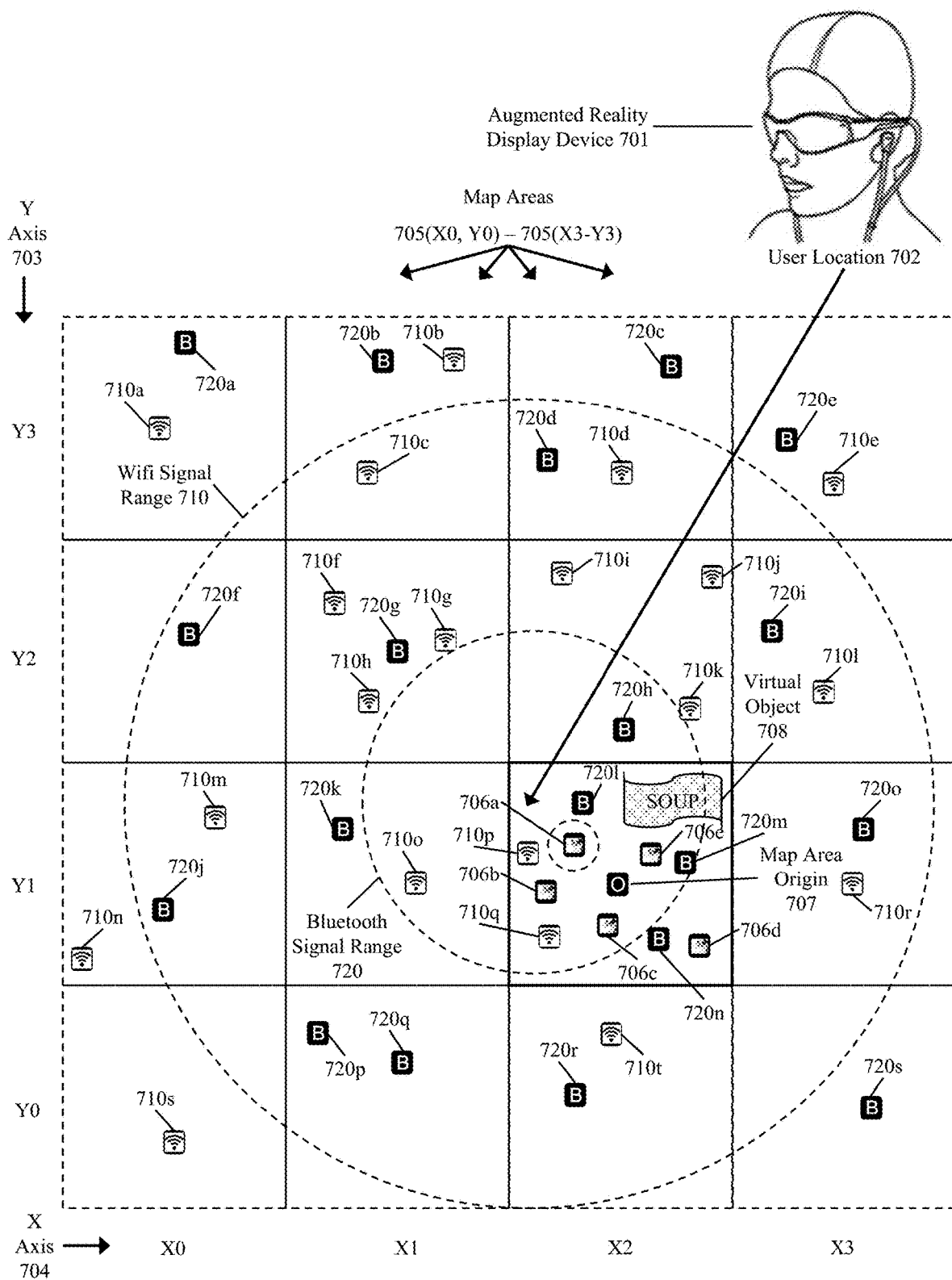

Finally, FIG. 7J illustrates an example virtual object 708 displayed relative to the map area origin 707 in response to the determination of the location of the augmented reality display device 701. This virtual object 708 would be displayed in the same position and orientation for all users and therefore facilitate shared experiences. Thus, one user might point towards the virtual sign and another user might naturally look in that direction and be able to ascertain that the user is pointing to the virtual sign, or alternatively the user might have already seen the sign and understand that is what the user is pointing towards.

FIGS. 8A-D provide an illustrative example of an area localization process for a user at an undetermined location, according to some embodiments. The illustration provides an approach that may be performed separately as an alternative to, or in combination with, the process illustrated in FIGS. 7A-J. Specifically, FIGS. 8A-D illustrate a location based heuristic method of determining the map area that an augmented reality display device is in.

Figure 8A:
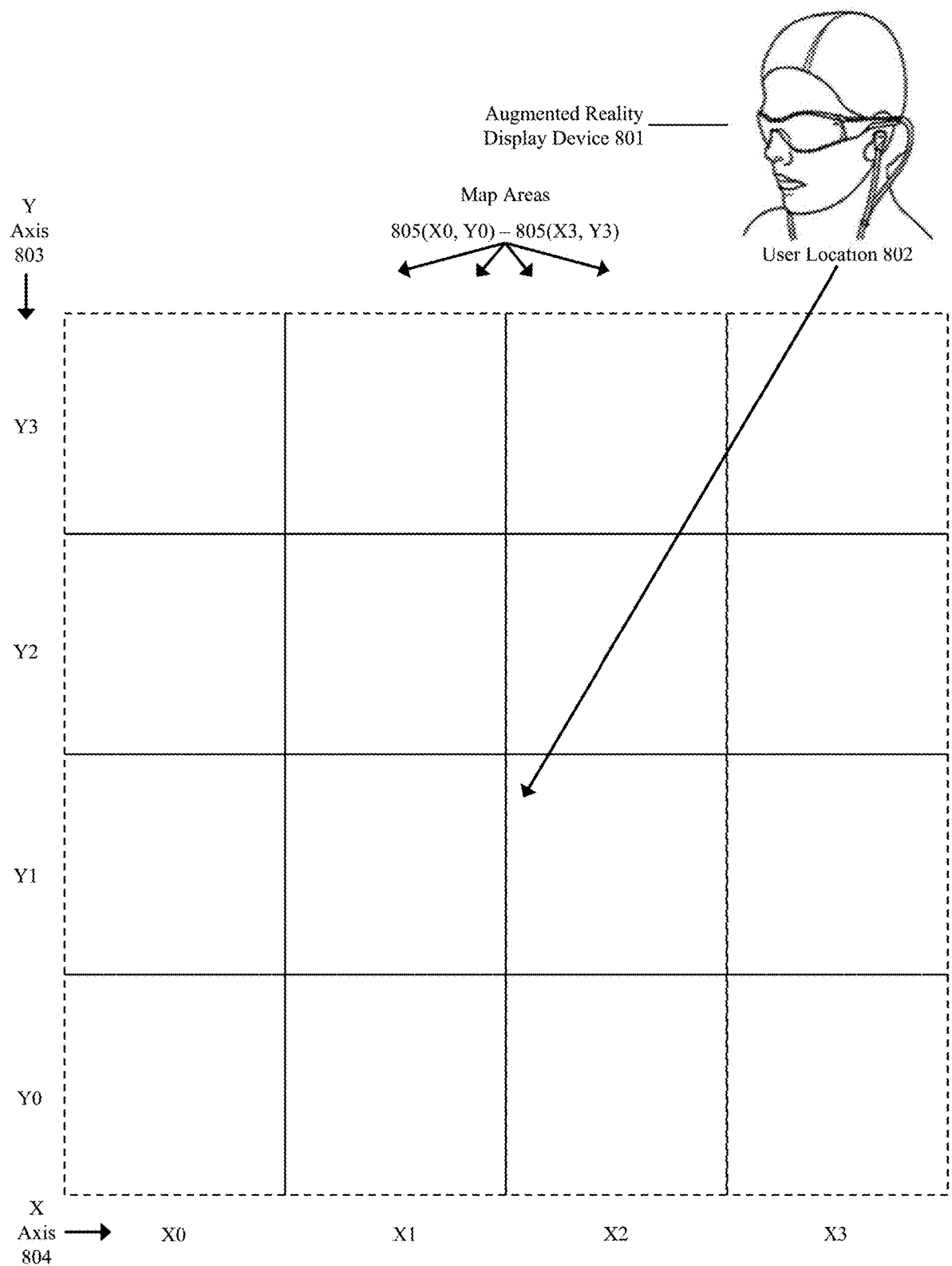
FIGS. 8A-D provide an illustrative example of an area localization process for a user at an undetermined location, according to some embodiments.

FIG. 8A includes map areas 805(X0, Y0)-805(X3, Y3) illustrated as a set of square regions identified here by their positions on an X axis 804 and Y axis 803. These are essentially equivalent to the previous illustration for map areas 705(X0, Y0)-705(X3, Y3) and X axis 704 and Y axis 703. Likewise, augmented reality display device 801 is equivalent to the augmented reality display device 701 and user location 802 is equivalent to the user location 702.

Figure 8B:
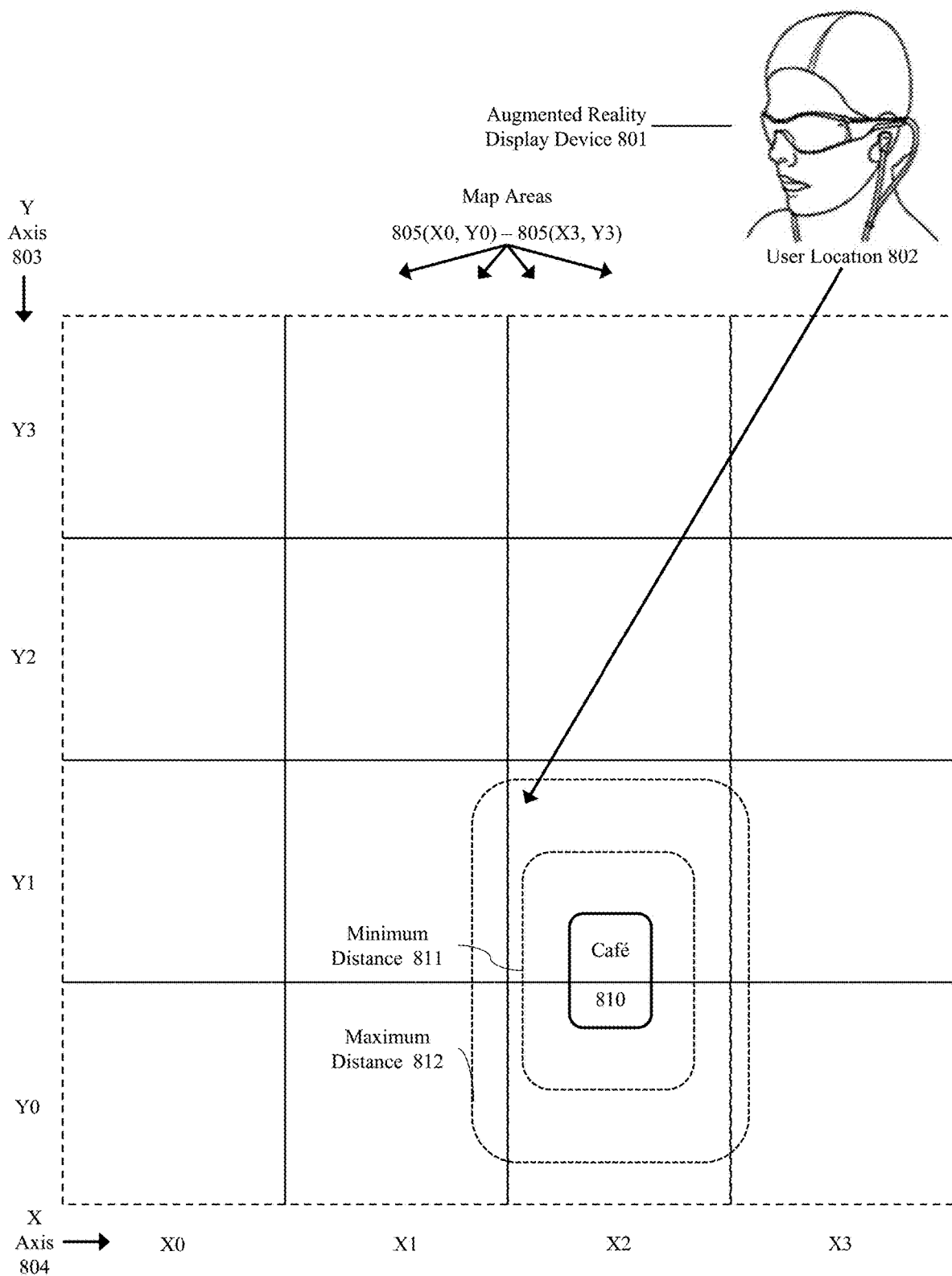

FIG. 8B illustrates the addition of a Wireless signal originating within a known boundary. Specifically, café 810 is representative of a known location with a known boundary from which the signal originates. Based on at least metadata associated with the signal a minimum and maximum distance from the boundary of café 810 is identified. The minimum distance is illustrated as rectangular element with rounded corners 811, while the maximum distance is illustrated as rectangular element with rounded corners 812. Such a signal might include a WiFi hotspot, WiMAX access point, or any other appropriate wireless communication protocol.

The region represented by the space between 811 and 812 represents the possible locations in which the augmented reality display device 801 may be located. As illustrated, this includes six map areas—(X1, Y0), (X2, Y0), (X3, Y0), (X1, Y1), (X2, Y1), and (X3, Y1)—but none of the six can be identified reliably as the matching map area without additional information. In some embodiments, the additional information might be collected based on the metadata matching processed discussed above, in which the metadata collected is used to determine which of the six map areas is the correct area.

Figure 8C:
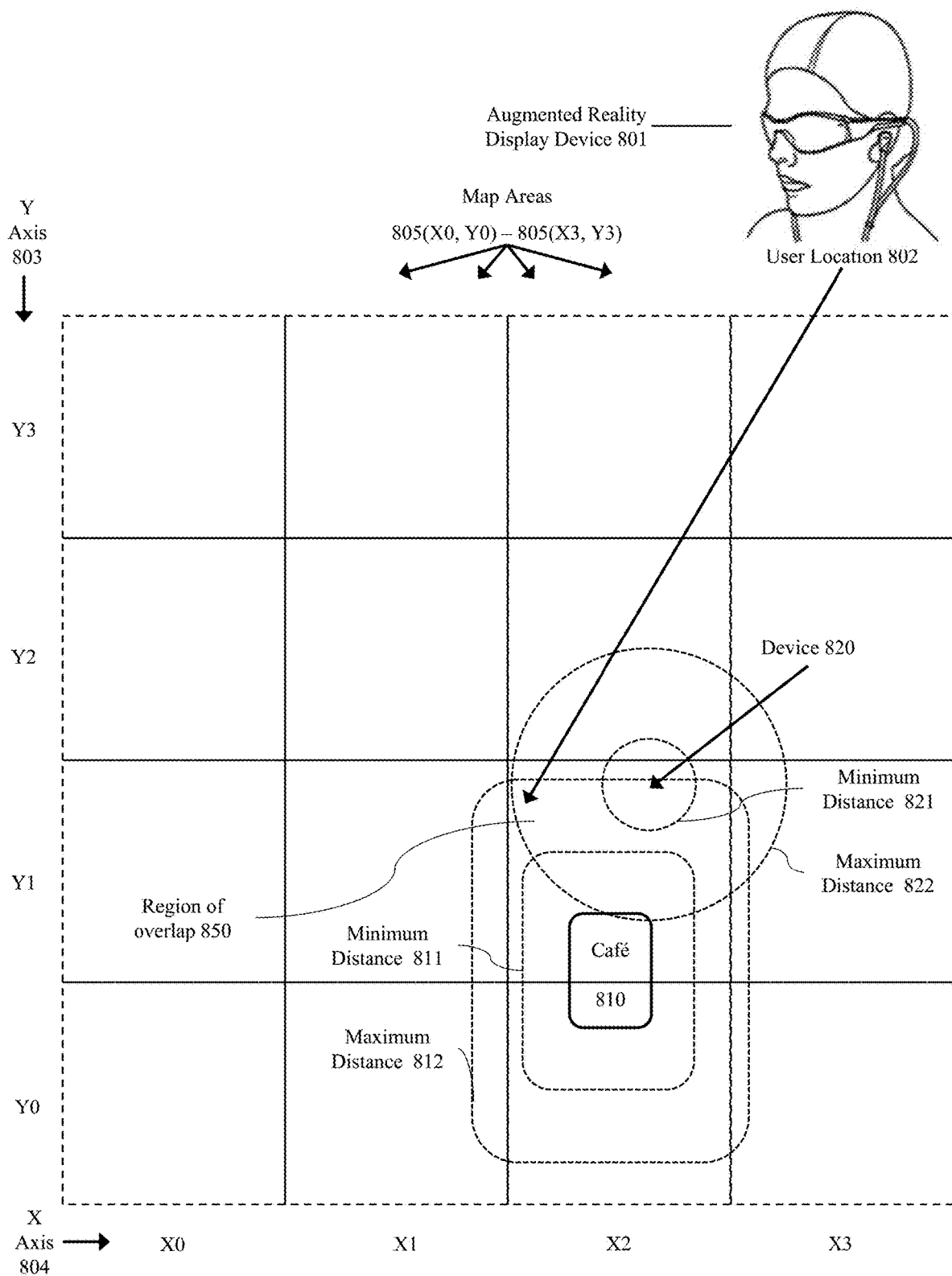

FIG. 8C illustrates the addition of new location data generated as a result of device 820. Device 820 might include a GPS mapping device, a cellular device, a cellular device with GPS or assisted GPS, or any other device with a wireless communication protocol that can exchange GPS data with an augmented reality system (e.g., the augmented reality system 110). Associated with the device 820 is a minimum distance 821 and a maximum distance 822 both illustrated as circular boundaries in which the augmented reality system might be located. By itself, the information collected as a result of communication with the device 820 would suggest that the augmented reality display device 801 is located in one of four map areas—(X2, Y1), (X3, Y1), (X2, Y2), and (X3, Y2)—as indicated by the area bounded by 821 and 822. However, this information can be combined with the other information already collected which indicates that the augmented reality system should be located in the region of overlap 850, where the area bounded by 811 and 812 overlaps with the area bounded by 821 and 822. Based on this information it can be determined that the augmented reality system is located in either map area (X2, Y1) or map area (X3, Y1). In some embodiments, this information might be combined with additional metadata via the metadata matching process discussed above to determine which of the two map areas is the correct map area.

Figure 8D:
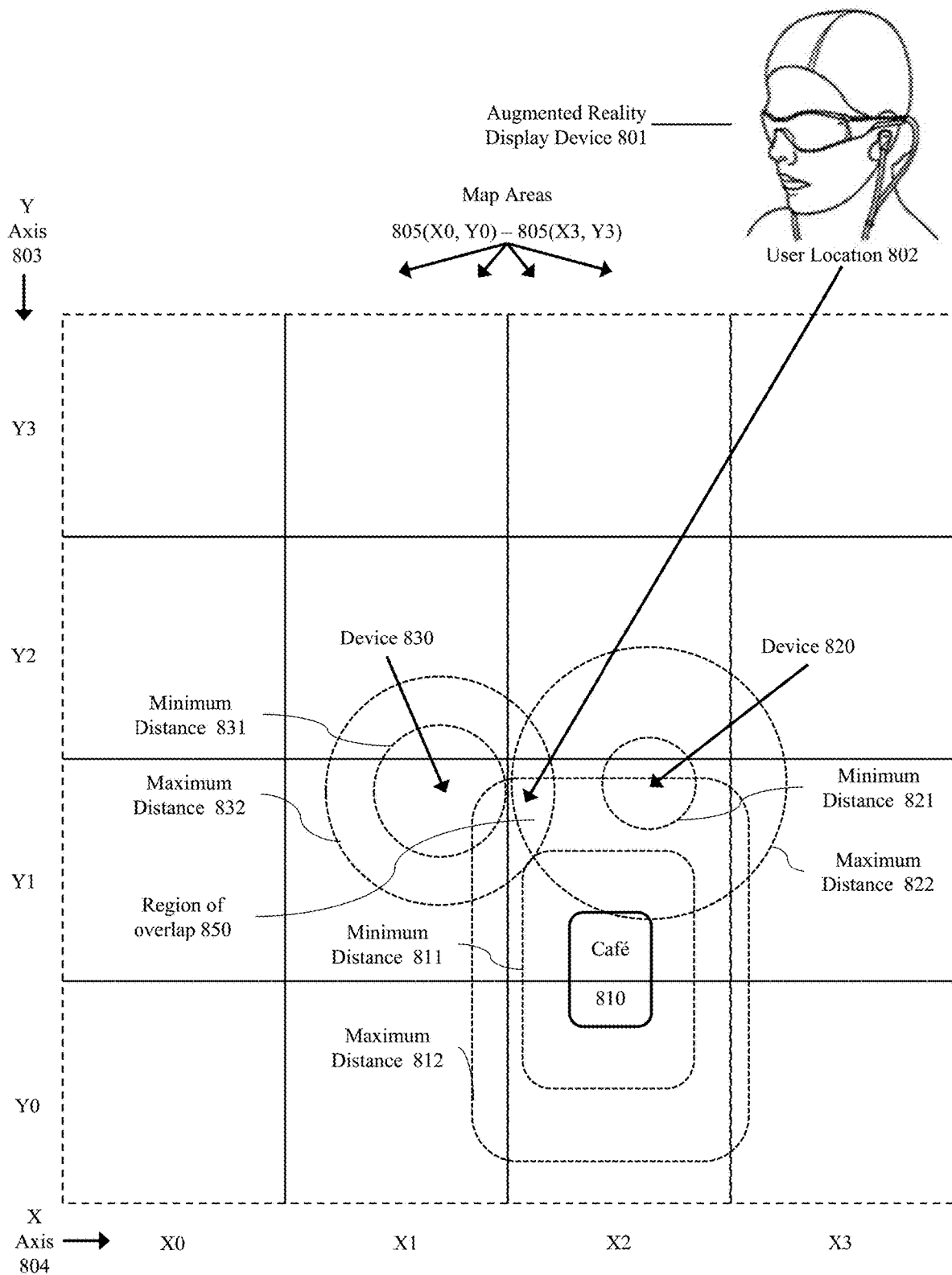

FIG. 8D illustrates another device providing information that can be used to identify a minimum and maximum distance from a measured point. Here device 830 has been identified, and has provided location information used to determine the minimum distance 831 from its measured location and the maximum distance 832 from its measured location. Thus, by adding this additional information to the determination of the region of overlap 850, the region of overlap 850 can be narrowed to the area that all boundaries encompass which indicates that the augmented reality system is located within map area (X2, Y1).

Furthermore, while the example illustrated in FIGS. 8A-D utilized location based heuristic data processing, additional data such as illustrated in the metadata matching process of FIGS. 7A-J may be used to assist in determining the correct map area. For instance, the location based heuristic information may be incomplete or the metadata collected may be insufficient to determine the correct map area the augmented reality system is located in after one or more sets (e.g. regions in which the augmented reality system is located) of location data is collected. Furthermore, any data collected may be analyzed in any order, including analyzing the data as it is received, such that as soon as any combination of information is received that is sufficient to determine the correct map area the process may be completed and coarse and fine localization processes may be completed.

System Architecture

Figure 9:
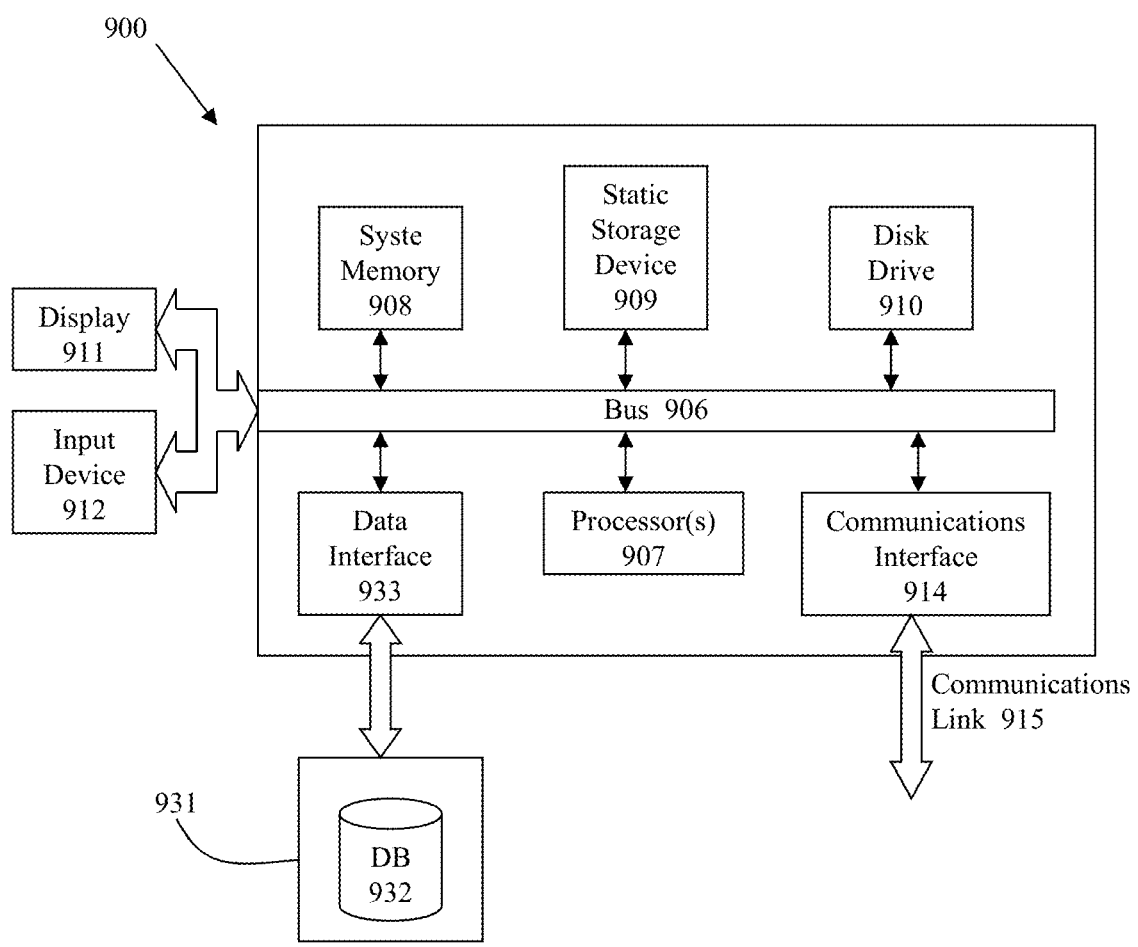
FIG. 9 shows an architecture of an example computing system with which the disclosure may be implemented.

FIG. 9 shows an architecture of an example computing system with which the disclosure may be implemented.

For example, the augmented reality content server 150 may include or comprise one or more similar systems to computer system 900 illustrated in FIG. 9, linked together to service requests from any number of augmented reality systems. Furthermore, the augmented reality system 110 may also correspond to a computer system like the computer system 900. Additionally, the modules of the augmented reality content server 150 and the augmented reality system 110 may be implemented as either hardware, software or some combination thereof as part of computer system 900.

Computer system 900 includes a bus 906 or other communication mechanism for communicating information, which interconnects subsystems and devices, such as processor(s) 907, system memory 908 (e.g., RAM), static storage device 909 (e.g., ROM), disk drive 910 (e.g., magnetic or optical), data interface 933 (e.g., database connection), communication interface 914 (e.g., modem or Ethernet card), display 911 (e.g., CRT or LCD), input device 912 (e.g., keyboard and cursor control).

According to one embodiment of the disclosure, computer system 900 performs specific operations by processor(s) 907 executing one or more sequences of one or more instructions contained in system memory 908. Such instructions may be read into system memory 908 from another computer readable/usable medium, such as static storage device 909 or disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In some embodiments, execution of the sequences of instructions to practice the disclosure is performed by a single computer system 900. In some embodiments, two or more computer systems 900 coupled by communication link 915 (e.g., LAN, PTSN, or wireless network) may perform the sequence of instructions required to practice the disclosure in coordination with one another.

Computer system 900 may transmit and receive messages, data, and instructions, including program, i.e., application code, through communication link 915 and communication interface 914. Received program code may be executed by processor 907 as it is received, and/or stored in disk drive 910, or other non-volatile storage for later execution. Database 932 in storage medium 931 may be used to store data accessible by system 900 via data interface 933.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed:

1. A method for determining position and orientation information of an augmented reality display device, comprising:
    identifying a map area associated with a current location of the augmented reality display device;
    determining an execution order of multiple localization modules for localizing the augmented reality display device based at least in part upon whether the current location associated with the map area is a determined or identified area to the augmented reality display device;
    in response to a determination that the current location associated with the map area includes an undetermined or unidentified area, determining a matching keyframe that is used to recognize the undetermined or unidentified area for the augmented reality display device, determining the matching keyframe comprising:
        triggering a first execution of a first localization module that compares a keyframe captured by the augmented reality display device to a plurality of known keyframes associated with the map area; and
        selecting a known keyframe from the plurality of known keyframes as the matching keyframe based at least in part on a respective similarity score determined for each of the plurality of known keyframes; and
    after the matching keyframe is determined, determining a pose for the augmented reality display device at least by triggering a second execution of a second localization module that determines a first matching keyframe, wherein the second execution comprises:
        determining one or more features in the keyframe captured by the augmented reality display device;
        comparing the one or more features in the keyframe to one or more corresponding features in at least one keyframe of the plurality of known keyframes; and
        determining a first keyframe from the plurality of known keyframes based at least in part a result of comparing the one or more features.

2. The method of claim 1, wherein identifying the map area associated with the current location comprises:
    receiving metadata, the metadata collected at the current location of the augmented reality display device; and
    analyzing the metadata to determine the map area, wherein the metadata corresponds to information pertaining to one or more communications networks.

3. The method of claim 1, wherein the pose for the augmented reality display device is determined with respect to a shared map area origin point, and determining the pose comprises:
    determining a first pose relative to the matching keyframe using at least the keyframe captured by the augmented reality display device and the matching keyframe by performing a keyframe analysis; and converting the first pose relative to the matching keyframe into the pose relative to the shared map area origin point using at least the first pose relative to the matching keyframe.

4. The method of claim 3, wherein converting the first pose relative to the matching keyframe into the pose relative to the shared map area origin point comprises performing first and second transformations on the pose relative to the matching keyframe, the first transformation is from the shared map area origin point to the matching keyframe, and the second transformation is from the matching keyframe to the keyframe captured by the augmented reality display device.

5. The method of claim 1, wherein identifying the matching keyframe associated with the map area further comprises:
  determining features of the keyframe captured by the augmented reality device, wherein
    comparing the keyframe captured by the augmented reality device to the plurality of known keyframes associated with the map area comprises comparing the features of the keyframe to corresponding features of the plurality of known keyframes, and
    determining a similarity score for at least some of the plurality of known keyframes, wherein determining the similarity score comprises analyzing the features of the keyframe with respect to the corresponding features of the plurality of known keyframes.

6. The method of claim 1, further comprising transmitting location-based content in response to at least one of identifying the map area, identifying the matching keyframe, or determining the pose, wherein the location-based content corresponds to data for one or more objects or one or more applications associated with at least one of the map area, the matching keyframe, or the pose.

7. The method of claim 1, further comprising transmitting user data for performing content sharing in response to at least one of identifying the map area, determining the matching keyframe, or determining the pose, wherein the content sharing comprises one-way or two-way exchange of content between devices over a local communications network.

8. The method of claim 1, further comprising transmitting map area data in response to identifying the map area; and updating the plurality of known keyframes.

9. The method of claim 1, further comprising:
  after the first matching keyframe is determined, determining the pose for the augmented reality display device at least further by triggering a third execution of a third localization module, the third execution comprising:
    determining a relative pose with respect to the first matching keyframe;
    determining a first position of the augmented reality display device with respect to an origin of the map area at least by chaining a first transform from the origin to the keyframe and a second transform from the keyframe to the augmented reality display device;
    translating a relative position with respect to the first matching keyframe to a first relative position with respect to the origin of the map area based at least in part upon the first and the second transforms; and
    determining the pose for the augmented reality display device with respect to the origin based at least in part upon the first relative position.

10. The method of claim 9, wherein the first matching frame is different from the matching keyframe.

11. The method of claim 1, wherein the keyframe captured by the augmented reality display device is received from an imaging device coupled to the augmented reality display device, and the imaging device has a known position relative to a user of the augmented reality display device.

12. The method of claim 1, the first execution of the first localization module comprising:
  receiving a first wireless signal corresponding to a first known location and a first known boundary;
  identifying a first pair of distances based at least in part upon first metadata associated with the first wireless signal; and
  determining a first subset of map areas in a map in which the augmented reality display device is located based at least in part upon the first pair of distances, wherein the plurality of known keyframes associated with the map area is stored as parts of a map area data set.

13. The method of claim 12, further comprising:
  receiving a second wireless signal corresponding to a second known location and a second known boundary;
  identifying a second pair of distances based at least in part upon second metadata associated with the second wireless signal; and
  determining a second subset from the first subset in which the augmented reality display device is located based at least in part upon the second pair of distances.

14. The method of claim 13, further comprising:
  determining an overlap between the first subset and the second subset; and
  determining the position and the orientation information of the augmented reality display device based at least in part upon the overlap.

15. A method for determining position and orientation information of an augmented reality display device, comprising:
  identifying a map area associated with a current location of the augmented reality display device;
  determining an execution order of multiple localization modules for localizing the augmented reality display device based at least in part upon whether the current location associated with the map area is a determined or identified area to the augmented reality display device;
  in response to a determination that the current location associated with the map area includes an undetermined or unidentified area, determining a matching keyframe that is used to recognize the undetermined or unidentified area for the augmented reality display device, determining the matching keyframe comprising:
    triggering a first execution of a first localization module that compares a first keyframe of a first plurality of keyframes received from the augmented reality display device to a second plurality of known keyframes associated with the map area;
    determining a first similarity score for at least some of the second plurality of known keyframes based at least in part upon a first result of comparing the first keyframe, and
    selecting a known keyframe from the second plurality of known keyframes as first matching keyframe based on at least the first similarity score; and
  identifying a second matching keyframe associated with the map area by:
    comparing a second keyframe of the first plurality of keyframes to the second plurality of known keyframes associated with the map area;

determining a second similarity score for at least a portion of the second plurality of known keyframes based at least in part upon comparing the second keyframe;

selecting a separate known keyframe of the second plurality of known keyframes as the second matching keyframe based on at least the second similarity score; and refining a first pose for the augmented reality display device with respect to a shared map area origin point using at least the second matching keyframe.

16. The method of claim 15, wherein identifying the map area associated with the current location comprises:

receiving metadata, the metadata collected at the current location of the augmented reality display device; and determining the map area based at least in part upon an analysis result of analyzing the metadata, wherein the metadata corresponds to information pertaining to one or more communications networks.

17. The method of claim 15, further comprising determining a pose for the augmented reality display device with respect to a shared map area origin point, wherein determining the pose further comprises:

determining a relative pose relative to the first matching keyframe using the first keyframe and the first matching keyframe at least by performing a keyframe analysis; and converting the relative pose relative to the first matching keyframe into the pose relative to the shared map area origin point using at least the relative pose relative to the first matching keyframe.

18. The method of claim 17, wherein converting the relative pose into the pose relative to the shared map area origin point comprises performing a first transformation and a second transformation on the relative pose, wherein the first transformation is from the shared map area origin point to the first matching keyframe, and the second transformation is from the first matching keyframe to the first keyframe.

* * * * *